(12) United States Patent
Yasuie et al.

(10) Patent No.: US 8,542,601 B2
(45) Date of Patent: Sep. 24, 2013

(54) ABNORMALITY LOCATING METHOD AND APPARATUS, AND COMPUTER-READABLE STORAGE MEDIUM

(75) Inventors: Takeshi Yasuie, Kawasaki (JP); Yuji Nomura, Kawasaki (JP); Tetsuya Nishi, Kawasaki (JP); Shunsuke Kikuchi, Kawasaki (JP); Taichi Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 389 days.

(21) Appl. No.: 12/795,493

(22) Filed: Jun. 7, 2010

(65) Prior Publication Data

US 2010/0322081 A1      Dec. 23, 2010

(30) Foreign Application Priority Data

Jun. 17, 2009   (JP) .................................. 2009-143949

(51) Int. Cl.
  *G06F 11/00*      (2006.01)
(52) U.S. Cl.
  USPC ................ 370/242; 370/248; 714/31; 714/37
(58) Field of Classification Search
  USPC .................. 370/216, 241, 242, 248, 250–252; 714/100, 1, 25, 30–32, 37
  See application file for complete search history.

(56) References Cited

U.S. PATENT DOCUMENTS

| | | | | |
|---|---|---|---|---|
| 7,937,247 B2 * | 5/2011 | Carter et al. | ................. | 714/25 |
| 2006/0155411 A1 * | 7/2006 | Khoche et al. | ................. | 700/108 |
| 2007/0028220 A1 * | 2/2007 | Miller et al. | ................. | 717/124 |
| 2008/0101227 A1 * | 5/2008 | Fujita et al. | ................. | 370/232 |
| 2010/0100768 A1 * | 4/2010 | Yamamoto et al. | ................. | 714/32 |

FOREIGN PATENT DOCUMENTS

| | | | |
|---|---|---|---|
| JP | 2006-229421 | * | 8/2006 |
| JP | 2006-238052 | * | 9/2006 |
| WO | WO2009/004701 | * | 1/2009 |

OTHER PUBLICATIONS

Tachibana, Atsuo et al., "Empirical Study on Locating Congested Segments over the Internet Based on Multiple End-to-End Path Measurements", Technical Report of IEICE, (CQ vol. 104, No. 309), Sep. 2004, pp. 43-48, with partial English translation.

* cited by examiner

*Primary Examiner* — Kerri Rose
(74) *Attorney, Agent, or Firm* — Fujitsu Patent Center

(57) ABSTRACT

An abnormality locating apparatus locates an abnormal location in a network. An abnormal location judging part judges a normality or abnormality of a link based on a normality or abnormality of an observation flow, by acquiring information of links through which each observation flow passes, from a network route information storage that stores passing route information of observation flows passing through the links. A diagnosis accuracy judging part judges that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

20 Claims, 28 Drawing Sheets

| LINK | TABULATION OF INTERMEDIATE JUDGEMENT RESULT AT EACH OBSERVATION POINT | | | | FINAL ABNORMALITY JUDGEMENT RESULT OF LINK |
|---|---|---|---|---|---|
| | NORMAL | LOW POSSIBILITY OF ABNORMALITY | HIGH POSSIBILITY OF ABNORMALITY | NO PASSING | |
| 1 (A⇔R1) | 3 | 2 | 0 | 0 | NORMAL |
| 2 (R1⇔R2) | 0 | 2 | 2 | 1 | HIGH POSSIBILITY OF ABNORMALITY |
| 3 (B⇔R2) | 0 | 2 | 3 | 0 | HIGH POSSIBILITY OF ABNORMALITY |
| 4 (R1⇔R3) | 3 | 1 | 0 | 1 | NORMAL |
| 5 (R2⇔R5) | 0 | 2 | 2 | 1 | HIGH POSSIBILITY OF ABNORMALITY |
| 6 (R3⇔R4) | 4 | 0 | 0 | 1 | NORMAL |
| 7 (R4⇔R5) | 2 | 0 | 0 | 3 | NORMAL |
| 8 (C⇔R5) | 3 | 2 | 0 | 0 | NORMAL |
| 9 (E⇔R3) | 4 | 1 | 0 | 0 | NORMAL |
| 10 (R4⇔R6) | 3 | 0 | 0 | 2 | NORMAL |
| 11 (R5⇔R6) | 2 | 1 | 0 | 2 | NORMAL |
| 12 (D⇔R6) | 4 | 1 | 0 | 0 | NORMAL |

FIG.2

| OBSERVATION FLOW | | OBSERVATION FLOW PASSING LINK | | |
|---|---|---|---|---|
| SOURCE INFO (SOURCE OBSERVATION POINT) | DESTINATION INFO (END OBSERVATION POINT) | 2 | 3 | 5 |
| A | B | x | | |
| A | C | x | | x |
| B | A | x | x | |
| B | C | | x | x |
| B | D | x | x | x |
| B | E | x | x | |
| C | A | | | x |
| C | B | | x | x |
| D | B | | x | x |
| E | B | x | x | |

FIG.4

| LINK | TABULATION OF INTERMEDIATE JUDGEMENT RESULT AT EACH OBSERVATION POINT | | | | FINAL ABNORMALITY JUDGEMENT RESULT OF LINK |
|---|---|---|---|---|---|
| | NORMAL | LOW POSSIBILITY OF ABNORMALITY | HIGH POSSIBILITY OF ABNORMALITY | NO PASSING | |
| 1 (A⇔R1) | 3 | 2 | 0 | 0 | NORMAL |
| 2 (R1⇔R2) | 0 | 2 | 2 | 1 | HIGH POSSIBILITY OF ABNORMALITY |
| 3 (B⇔R2) | 0 | 2 | 3 | 0 | HIGH POSSIBILITY OF ABNORMALITY |
| 4 (R1⇔R3) | 3 | 1 | 0 | 1 | NORMAL |
| 5 (R2⇔R5) | 0 | 2 | 2 | 1 | HIGH POSSIBILITY OF ABNORMALITY |
| 6 (R3⇔R4) | 4 | 0 | 0 | 1 | NORMAL |
| 7 (R4⇔R5) | 2 | 0 | 0 | 3 | NORMAL |
| 8 (C⇔R5) | 3 | 2 | 0 | 0 | NORMAL |
| 9 (E⇔R3) | 4 | 1 | 0 | 0 | NORMAL |
| 10 (R4⇔R6) | 3 | 0 | 0 | 2 | NORMAL |
| 11 (R5⇔R6) | 2 | 1 | 0 | 2 | NORMAL |
| 12 (D⇔R6) | 4 | 1 | 0 | 0 | NORMAL |

FIG.11

| SOURCE INFO (SOURCE OBSERVATION POINT) | DESTINATION INFO | PASSING ROUTE INFO |
|---|---|---|
| A | B | A→R1→R2→B |
| A | C | A→R1→R2→R5→C |
| A | D | A→R1→R3→R4→R6→D |
| A | E | A→R1→R3→E |
| ---- | ---- | ---- |
| E | B | E→R3→R1→R2→B |
| E | C | E→R3→R4→R5→C |
| E | D | E→R3→R4→R6→D |
| A | R1 | A→R1 |
| ---- | ---- | ---- |
| A | R2 | A→R1→R2 |
| B | R2 | B→R2 |
| C | R2 | C→R5→R2 |
| D | R2 | D→R6→R5→R2 |
| E | R2 | E→R3→R1→R2 |
| ---- | ---- | ---- |
| E | R6 | E→R3→R4→R6 |

ROUTE INFORM BETWEEN OBSERVATION POINTS

ROUTE INFORMATION BETWEEN OBSERVATION POINT & RELAY NODE (NECESSARY WHEN MAKING ADDITIONAL SEARCH BETWEEN OBSERVATION POINT AND NODE α)

FIG.12

| SOURCE INFO (SOURCE OBSERVATION POINT) | DESTINATION INFO | QUALITY INFO (PACKET LOSS RATE) | FLOW ABNORMALITY JUDGEMENT RESULT |
|---|---|---|---|
| A | B | 1.0 | ABNORMAL |
| A | C | 2.1 | ABNORMAL |
| A | D | 0.0 | NORMAL |
| A | E | 0.0 | NORMAL |
| ---- | ---- | ---- | ---- |
| E | B | 1.0 | ABNORMAL |
| E | C | 0.0 | NORMAL |
| E | D | 0.0 | NORMAL |

FLOW ABNORMALITY JUDGING THRESHOLD VALUE = 0.5%

FIG.13

| SOURCE INFO (SOURCE OBSERVATION POINT) | DESTINATION INFO | QUALITY INFO (RTT) | FLOW ABNORMALITY JUDGEMENT RESULT |
|---|---|---|---|
| A | B | 150 | ABNORMAL |
| A | C | 200 | ABNORMAL |
| A | D | 15 | NORMAL |
| A | E | 20 | NORMAL |
| ---- | ---- | ---- | ---- |
| E | B | 150 | ABNORMAL |
| E | C | 15 | NORMAL |
| E | D | 20 | NORMAL |

FLOW ABNORMALITY JUDGING THRESHOLD VALUE = 100 msec

FIG.14

| RELAY NODE INFO | CONNECTING LINK INFO |
|---|---|
| R1 | 1,2,4 |
| R2 | 2,3,5 |
| R3 | 4,6,9 |
| R4 | 6,7,10 |
| R5 | 5,7,8,11 |
| R6 | 10,11,12 |

FIG.15

| RELAY NODE INFO | CONNECTING LINK INFO |
|---|---|
| R1 | 1,[2],4 |
| R2 | [2,3,5] |
| R3 | 4,6,9 |
| R4 | 6,7,10 |
| R5 | [5],7,8,11 |
| R6 | 10,11,12 |

FIG.16

| RELAY NODE INFO | CONNECTING LINK INFO |
|---|---|
| R1 | 1,[2],4 |
| R2 | [2,3,5] |
| R3 | 4,6,9 |
| R4 | 6,7,10 |
| R5 | [5],7,8,11 |
| R6 | 10,11,12 |

FIG.18

| SOURCE INFO (SOURCE OBSERVATION POINT) | DESTINATION INFO (NODE α) | PASSING ROUTE INFO |
|---|---|---|
| A | R2 | A→R1→R2 (LINK 2) |
| B | R2 | B→R2 (LINK 3) |
| C | R2 | C→R5→R2 (LINK 5) |
| D | R2 | D→R6→R5→R2 (LINK 5) |
| E | R2 | E→R3→R1→R2 (LINK 2) |

FIG.19

| SOURCE INFO (SOURCE OBSERVATION POINT) | DESTINATION INFO | CONNECTING LINK OF CHECK TARGET NODE α (R2) | QUALITY INFO (PACKET LOSS RATE) | FLOW ABNORMALITY JUDGEMENT RESULT |
|---|---|---|---|---|
| A | R2 | 2 (R2⇔R1) | 1.0 | ABNORMAL |
| B | R2 | 3 (R2⇔B) | 0.0 | NORMAL |
| C | R2 | 5 (R2⇔R5) | 1.1 | ABNORMAL |
| D | R2 | 5 (R2⇔R5) | 1.0 | ABNORMAL |
| E | R2 | 2 (R2⇔R1) | 1.1 | ABNORMAL |

FLOW ABNORMALITY JUDGING THRESHOLD VALUE = 0.5%

FIG.21

| SOURCE INFO (SOURCE OBSERVATION POINT) | DESTINATION INFO | CONNECTING LINK OF CHECK TARGET NODE α (R2) | QUALITY INFO (PACKET LOSS RATE) | FLOW ABNORMALITY JUDGEMENT RESULT |
|---|---|---|---|---|
| A | R2 | 2 (R2⇔R1) | 1.0 | ABNORMAL |
| B | R2 | 3 (R2⇔B) | 0.0 | NORMAL |
| C | R2 | 5 (R2⇔R5) | 1.1 | ABNORMAL |

FLOW ABNORMALITY JUDGING THRESHOLD VALUE = 0.5%

FIG.22

| SOURCE INFO (SOURCE OBSERVATION POINT) | DESTINATION INFO (END OBSERVATION POINT) | PASSING ROUTE INFO |
|---|---|---|
| A | B | A→R1→R2→B (LINK 2,3) |
| A | C | A→R1→R2→R5→C (LINK 2,5) |
| B | A | B→R2→R1→A (LINK 2,3) |
| B | C | B→R2→R5→C (LINK 3,5) |
| B | D | B→R2→R5→R6→D (LINK 3,5) |
| B | E | B→R2→R1→R3→E (LINK 2,3) |
| C | A | C→R5→R2→R1→A (LINK 2,5) |
| C | B | C→R5→R2→B (LINK 3,5) |
| D | B | D→R6→R5→R2→B (LINK 3,5) |
| E | B | E→R3→R1→R2→B (LINK 2,3) |

FIG.24

| SOURCE INFO (SOURCE OBSERVATION POINT) | DESTINATION INFO (END OBSERVATION POINT) | QUALITY INFO (PACKET LOSS RATE) |
|---|---|---|
| A | B | 1.0 |
| A | C | 2.1 |
| B | A | 1.0 |
| B | C | 0.9 |
| B | D | 1.0 |
| B | E | 1.0 |
| C | A | 1.9 |
| C | B | 1.0 |
| D | B | 1.1 |
| E | B | 1.0 |

FIG.27

| SOURCE INFO (SOURCE OBSERVATION POINT) | DESTINATION INFO | PASSING ROUTE INFO |
|---|---|---|
| A | B | A→R1→R2→B |
| A | C | A→R1→R3→C |
| B | A | B→R2→R1→A |
| B | C | B→R2→R3→C |
| C | A | C→R3→R1→A |
| C | B | C→R3→R2→B |

FIG.29

| SOURCE INFO (SOURCE OBSERVATION POINT) | DESTINATION INFO (END OBSERVATION POINT) | QUALITY INFO (PACKET LOSS RATE) |
|---|---|---|
| A | B | 0.0 |
| A | C | 0.0 |
| B | A | 0.0 |
| C | A | 0.0 |

ABNORMALITY LOCATING METHOD AND APPARATUS, AND COMPUTER-READABLE STORAGE MEDIUM

CROSS-REFERENCE TO RELATED APPLICATIONS

This application is based upon and claims the benefit of priority of the prior Japanese Patent Application No. 2009-143949, filed on Jun. 17, 2009, the entire contents of which are incorporated herein by reference.

FIELD

The present invention generally relates to abnormality locating methods and apparatuses and storage media, and more particularly to an abnormality locating method and an abnormality locating apparatus for locating an abnormality in a network, and to a computer-readable storage medium that stores a program for causing a computer to locate such an abnormality in the network.

BACKGROUND

Networks have become complex and more versatile in recent years. As a result, there are demands to quickly and accurately locate an abnormality in the network in network monitoring, fault monitoring and the like.

Conventionally, as one example of a technique to locate the abnormality in the network, there is a network tomography analysis that analyzes the abnormality within the network based on normal or abnormal information of an end-to-end observation flow (or measurement flow) of the network. Such a network tomography analysis is proposed in Atsuo Tachibana et al., "Empirical Study on Locating Congested Segments over the Internet Based on Multiple End-to-End Path Measurements", Technical Report of IEICE, The Institute of Electronics, Information and Communication Engineers, CQ2004-76, OIS2004-30, IE2004-37 (CQ Vol. 104, No. 309), September 2004, pp. 43-48, for example. The observation flow refers to a route that is specified by a source observation point and an end observation point and is used to monitor the abnormality based on quality information such as a packet loss rate.

A description will now be given of the example of the network tomography analysis, by referring to FIGS. 1 and 2. FIG. 1 is a diagram illustrating an example of a network in which an abnormality is to be located. FIG. 2 is a matrix diagram illustrating examples of observation flows mapped with observation flow passing links through which the observation flows that observe an abnormality pass. FIG. 2 illustrates the matrix diagram in a state after elimination of observation flow passing links through which the observation flows that observe normality pass.

The network illustrated in FIG. 1 includes flow quality measuring agents A through E, relay nodes R1 through R6, and links 1 through 12. It is assumed for the sake of convenience that the links 2 and 5 are abnormality generated links in which an abnormality, such as packet loss, is generated. In FIG. 1, the observation flow is represented by a sign of the flow quality measuring agent at a source and a sign of the flow quality measuring agent at a destination. For example, an observation flow of the source flow quality measuring agent A and the destination flow quality measuring agent B is represented by AB.

For example, the network tomography analysis generally includes procedures p1, p2 and p3. The procedure p1 judges whether each observation flow is normal or abnormal, and maps normal or abnormal information to the observation flow passing link through which the observation flow passes. The procedure p2 eliminates the normal flow passing link through which one or more normal observation flows pass. The procedure p3 judges a link set covering the abnormal observation flow in which the abnormality is observed as a suspicious location of the abnormality.

In the case of the matrix diagram illustrated in FIG. 2, all of the abnormal observation flows may be covered by one of the link sets of the links 2 and 5, the links 2 and 3, and the links 3 and 5 or, by the link set of the links 2, 3 and 5. Hence, the link sets of the links 2 and 5, the links 2 and 3, the links 3 and 5, and the links 2, 3 and 5 are regarded as the suspicious locations of the abnormality.

However, if the procedure p3 of the network tomography analysis may obtain a plurality of link sets covering the abnormal observation flows, a correct diagnosis cannot be obtained in a case where a suspicious location of the abnormality is erroneously located (that is, an erroneous detection), and in a case where an abnormal location is erroneously judged as being normal (that is, an abnormality overlook).

In addition, in the process of extracting the link set covering the abnormal observation flows, it is necessary to solve the algorithm of a set cover problem. For this reason, even if an approximation algorithm is used, the processing load (or processing time) of the process of extracting the link set covering the abnormal observation flows becomes large, and the judgement to determine whether a plurality of link sets may be obtained is not carried out in some cases. In such cases, it is impossible to judge the accuracy of the diagnosis result.

Therefore, according to the conventional network tomography analysis, the accuracy of the diagnosis result may deteriorate because the diagnosis result may include the erroneous detection or the abnormality overlook, depending on the pattern of the locations where the abnormality is generated. Moreover, the conventional network tomography analysis cannot judge the accuracy of the diagnosis result from the pattern of the locations where the abnormality is generated.

SUMMARY

One aspect of the present invention is to provide an abnormality locating method, an abnormality locating apparatus and a computer-readable storage medium, that may accurately locate abnormalities from an observation flow that is observed from a plurality of observation points.

According to one aspect of the present invention, there is provided an abnormality locating method, to be implemented in a computer, to locate an abnormal location in a network, comprising judging, by the computer, a normality or abnormality of a link based on a normality or abnormality of an observation flow, by acquiring information of links through which each observation flow passes, from a network route information storage that stores passing route information of observation flows passing through the links; and judging, by the computer, that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

According to one aspect of the present invention, there is provided an abnormality locating apparatus for locating an abnormal location in a network, comprising an abnormal location judging part configured to judge a normality or abnormality of a link based on a normality or abnormality of an observation flow, by acquiring information of links through which each observation flow passes, from a network route information storage that stores passing route information of observation flows passing through the links; and a diagnosis accuracy judging part configured to judge that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

According to one aspect of the present invention, there is provided a computer-readable storage medium that stores a program which, when executed by a computer, causes the computer to perform a process to locate an abnormal location in a network, said program comprising a procedure causing the computer to judge a normality or abnormality of a link based on a normality or abnormality of an observation flow, by acquiring information of links through which each observation flow passes, from a network route information storage that stores passing route information of observation flows passing through the links; and a procedure causing the computer to judge that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

According to one aspect of the present invention, there is provided an abnormality locating system comprising a plurality of flow quality measuring agents; and an abnormality locating apparatus described above, that is coupled to and communicatable with the plurality of flow quality measuring agents, and is configured to locate the abnormal location in the network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a matrix diagram illustrating examples of observation flows mapped with observation flow passing links through which the observation flows that observe an abnormality pass;

FIG. 4 is a diagram indicating final abnormality judgement results of the links according to a modified network tomography analysis;

FIG. 11 is a diagram illustrating an example of information stored in a network route information database;

FIG. 12 is a diagram illustrating an example of flow quality information stored in a flow quality information database when a packet loss is a measuring target for the flow quality information;

FIG. 13 is a diagram illustrating an example of flow quality information stored in the flow quality information database when a Round Trip Time (RTT) is the measuring target for the flow quality information;

FIG. 14 is a diagram illustrating an example of information stored in a relay node connecting link information database;

FIG. 15 is a diagram illustrating an example of a structure of the relay node connecting link information data, indicating abnormal flow passing links;

FIG. 16 is a diagram illustrating an example of a structure of the relay node connecting link information data, indicating links having a possibility of including an abnormality;

FIG. 18 is a diagram illustrating an example of information stored in the network route information database;

FIG. 19 is a diagram illustrating an example of measured results obtained by an additional search;

FIG. 21 is a diagram illustrating an example of the measured results obtained by the additional search;

FIG. 22 is a diagram illustrating an example of information stored in the network route information database, indicating connecting link passing pairs;

FIG. 24 is a diagram illustrating a part of the information stored in the flow quality information database illustrated in FIG. 12 and related to the example;

FIG. 27 is a diagram illustrating an example of information stored in the network route information database;

FIG. 29 is a diagram illustrating an example of information stored in the flow quality information database.

DESCRIPTION OF EMBODIMENTS

Preferred embodiments of the present invention will be described with reference to the accompanying drawings.

A description will now be given of an abnormality locating method, an abnormality locating apparatus, and a computer-readable storage medium in each embodiment according to the present invention. In the following description, a link represents a location including the link itself and nodes on both ends of thereof. In other words, the embodiments described hereunder do not determine whether an abnormality is generated in the link itself or in the nodes on both ends thereof.

The end-to-end observation flow (or measurement flow) always passes through 2 links, namely, an input link and an output link, among connection links of each relay node. In a case where all of the observation flows passing through the relay node are abnormal, it becomes impossible to determine at the relay node whether the abnormality is generated in the input link or the output link.

It may be regarded that the accuracy of the diagnosis result deteriorates in the conventional network tomography analysis because it becomes impossible to determine at the relay node whether the abnormality is generated in the input link or the output link. The conventional network tomography analysis outputs the diagnosis result using the same analysis procedure regardless of whether there exists a relay node for which all of the observation flows passing through this relay node are abnormal.

Hence, it may be regarded that the following first and second characteristics occur when the accuracy of the diagnosis result deteriorates in the conventional network tomography analysis.

Figure 3A:
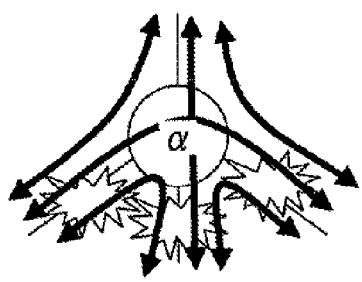
FIGS. 3A, 3B and 3C illustrate examples of a node α.
Figure 3B:
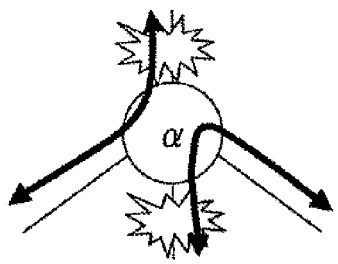
Figure 3C:
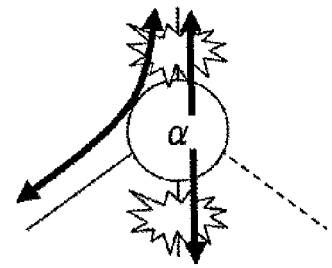

The first characteristic is that there exists at least one relay node for which all of the observation flows passing through this relay node are abnormal. In this specification, such a relay node for which all of the observation flows passing through this relay node are abnormal will be referred to as "a node α". FIGS. 3A, 3B and 3C illustrate examples of the node α. In FIGS. 3A through 3C, an abnormal observation flow is indicated by a bold solid arrow, a link in which an abnormality is generated is indicated by an explosion-like mark, and a link through which no observation flow passes is indicated by a dotted line.

The second characteristic is that a link which may be diagnosed erroneously is always connected to the node α. Accordingly, in the network tomography analysis, it becomes possible to judge the accuracy of the diagnosis result by judging whether the node α exists.

The judgement to determine whether the node α exists may be made in the following manner. That is, in a case where the node α exists according to the network tomography analysis, all of the connection links of the node α should remain without being eliminated after the procedure p2 described above. Of course, it is assumed that the link through which the observation flow does not pass is not eliminated in the procedure p2.

In the abnormality locating apparatus of one embodiment of the present invention, a check is made to determine whether all of the connection links are included for each relay node after the procedure p2, and it is judged that this relay node including all of the connection links is a node α. In addition, if a part of or all of the connection links are not included in the relay node after the procedure p2, it is judged that this relay node is not a node α.

The concept of being able to judge the accuracy of the diagnosis result if it is possible to judge whether the node α exists, may also be applied to a variation or modification of the network tomography analysis (hereinafter referred to as "a modified network tomography analysis").

For example, the modified network tomography analysis generally includes procedures P1, P2 and P3. The procedure P1 judges whether each observation flow is normal or abnormal for each observation point, and maps normal or abnormal information to the observation flow passing link through which the observation flow passes. The procedure P2 judges the possibility of an abnormality of each link, using a relationship of high-level links or low-level links in a tree structure when viewed from each observation point. The procedure P3 tabulates and judges results of the procedure P2 at each of the observation points, in order to judge the final possibility of an abnormality of each link and locate the abnormality.

FIG. 4 is a diagram indicating final abnormality judgement results of the links according to the modified network tomography analysis. FIG. 4 illustrates an example where the possibility of the abnormality is indicated in 3 stages for each link, namely, "normal", "low possibility of abnormality", and "high possibility of abnormality".

However, if a plurality of link sets covering the abnormal observation flow in a minimum number of links may be obtained by the diagnosis using the network tomography analysis, the diagnosis using the modified network tomography analysis under the same condition would obtain the suspicious location of the abnormality in a range wider than necessary. For this reason, an operation of narrowing the actual location of the abnormality from the diagnosis result must be performed manually by relying on an operator. The narrowing of the actual location of the abnormality may include filtering, optimization and the like. Furthermore, the modified network tomography analysis cannot judge the accuracy of the diagnosis result. The erroneous detection may occur in the modified network tomography diagnosis, but the abnormality overlook will not occur in the modified network tomography diagnosis.

The judgement to determine whether the node α exists may be made in the following manner. That is, in the modified network tomography diagnosis, if the node α exists, all of the connection links of the node α should have been judged having the possibility of being abnormal after the procedure P3.

In the abnormality locating apparatus of another embodiment of the present invention, a check is made to determine whether it is judged, after the procedure P3, that all of the connecting links have the possibility of being abnormal for each relay node (or no judgement may be made because the observation flow does not pass through each relay node). If all of the connecting links are judged as having the possibility of being abnormal for a relay node (or no judgement may be made because the observation flow does not pass through the relay node), this relay node is judged as being the node α. On the other hand, if it is judged, after the procedure P3, that a part or all of the connecting links are normal (that is, there is no possibility of being abnormal) for a relay node, this relay node is judged as not being the node α.

If it is found that the node α exists as a result of judging the existence of the node α, the abnormality locating apparatus of this embodiment extracts the connecting links of the node α, and judges that the accuracy of the diagnosis result has a possibility of deteriorating for the extracted connecting links.

In addition, when it is found that the node α exists, the accuracy of the diagnosis result will deteriorate by the mere use of the network tomography analysis or the modified network tomography analysis. For this reason, it is conceivable to improve the accuracy of the diagnosis result by carrying out a further measurement or a further analysis. The conceivable method of carrying out the further measurement or analysis may include the following first and second methods.

The first method of carrying out the further measurement or analysis makes an additional search between the observation point and the node α. The accuracy of the diagnosis result has a possibility of deteriorating if the node α exists, because each observation flow passes at least 2 links (that is, the input link and the output link) among the connection links of each relay node. The accuracy of the diagnosis result may thus be prevented from deteriorating if the observation flow can be made to pass through the individual connecting links of the node α. Accordingly, in the case where it is found that the node α exists, an additional search is carried out by making the observation flow pass between the observation point and the node α, in order to individually check the connecting links of the node α and narrow the abnormal link.

On the other hand, the second method of carrying out the further measurement or analysis analyzes the degree of abnormality (or extent of abnormality) of the observation flow passing through the node α. As described above, each observation flow passes at least 2 links (that is, the input link and the output link) among the connection links of each relay node. Hence, the observation flow passing through 2 abnormal links should have a larger degree of abnormality compared to the observation flow passing through 1 abnormal link. Accordingly, in the case where it is found that the node α exists, the degree of abnormality of the observation flow is tabulated for each of connecting link pairs of the node α. As a result of this tabulation, if there exists link pairs for which the degree of abnormality is small compared to other link pairs, and a common connecting link is included in a set of link pairs for which the degree of abnormality is small compared to other link pairs, it is possible to narrow the abnormal links by judging that the common connecting link is normal, for example.

When judging the degree of abnormality, it is necessary to use values that are measured before the observation flow is judged as being normal or abnormal by a binary judgement. The abnormality locating apparatus of this embodiment may utilize the measured value of the observation flow that is stored if the measured value of the observation flow has been stored when judging the suspicious location of the abnormality. On the other hand, if the measured value of the observation flow has not been stored when judging the suspicious location of the abnormality, the abnormality locating apparatus of this embodiment carries out an additional search by passing the observation flow again through the node a after detecting the node α, when judging the suspicious location of the abnormality, in order to obtain the measured value of the observation flow.

Figure 5:
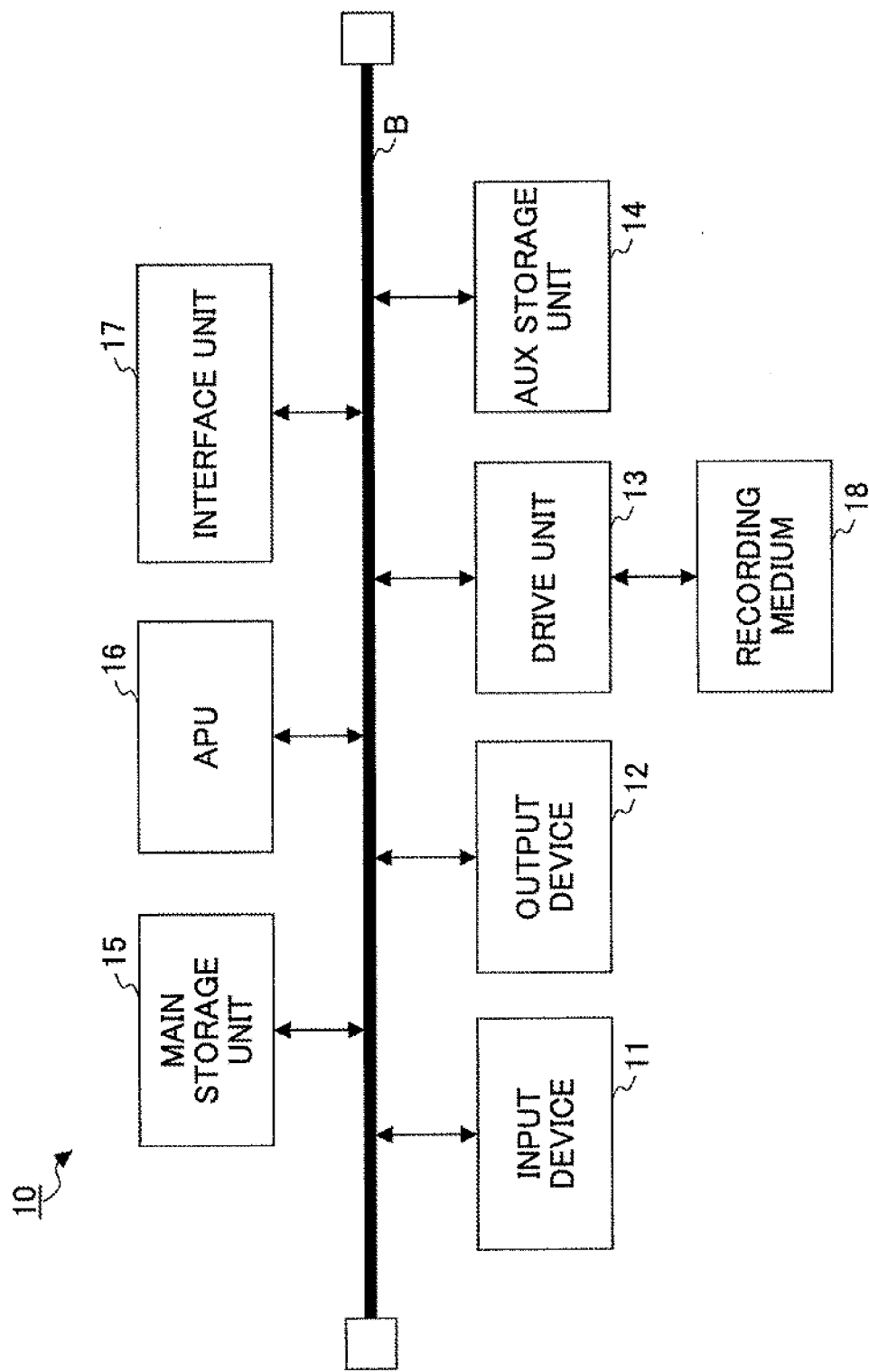
FIG. 5 is a block diagram illustrating an example of a hardware structure of the abnormality locating apparatus.

FIG. 5 is a block diagram illustrating an example of a hardware structure of the abnormality locating apparatus. An abnormality locating apparatus 10 illustrated in FIG. 5 includes an input device 11, an output device 12, a drive unit 13, an auxiliary storage unit 14, a main storage unit 15, an Arithmetic Processing Unit (APU) 16, and an interface unit 17 that are connected via a bus B.

The input device 11 may be formed by a keyboard, a mouse or the like, and is used by the operator to input various signals corresponding to data and instructions. The output device 12 may be formed by a display unit or the like, and is used to output (or display) various windows (or menus), data, messages and the like. The APU 16 may be formed by any processor or computer. The interface unit 17 may be formed by a modem, a Local Area Network (LAN) card or the like, and is used to connect the abnormality locating apparatus 10 to a network (not illustrated).

An abnormality locating program of this embodiment is formed by at least a part of various programs controlling the abnormality locating apparatus 10. The abnormality locating program causes the APU (or computer) 16 to execute a process including procedures of the abnormality locating method, in order to realize the functions of the abnormality locating apparatus 10. The abnormality locating program may be stored in a computer-readable storage medium 18 and distributed or, downloaded from the network. The storage medium 18 may be formed by any suitable recording medium capable of storing the abnormality locating program, such as a Compact Disc Read Only Memory (CD-ROM), a flexible disk and a magneto-optical disk that record information optically, electrically and magnetically, and semiconductor devices such as a ROM and a flash memory that record the information electrically.

When the storage medium 18 recorded with the abnormality locating program is set in the drive unit 13, for example, the abnormality locating program is installed from the storage medium 18 into the auxiliary storage unit 14 via the drive unit 13. The abnormality locating program downloaded from the network may be installed into the auxiliary storage unit 14 via the interface unit 17.

The auxiliary storage unit 14 stores the abnormality locating program installed therein, and files and data that are necessary for the operation of the abnormality locating apparatus 10. The abnormality locating program is read from the auxiliary storage unit 14 when starting (or booting) the abnormality locating program, and is stored in the main storage unit 15. The APU 16 carries out the process which will be described later by executing the abnormality locating program stored in the main storage unit 15.

Figure 6:
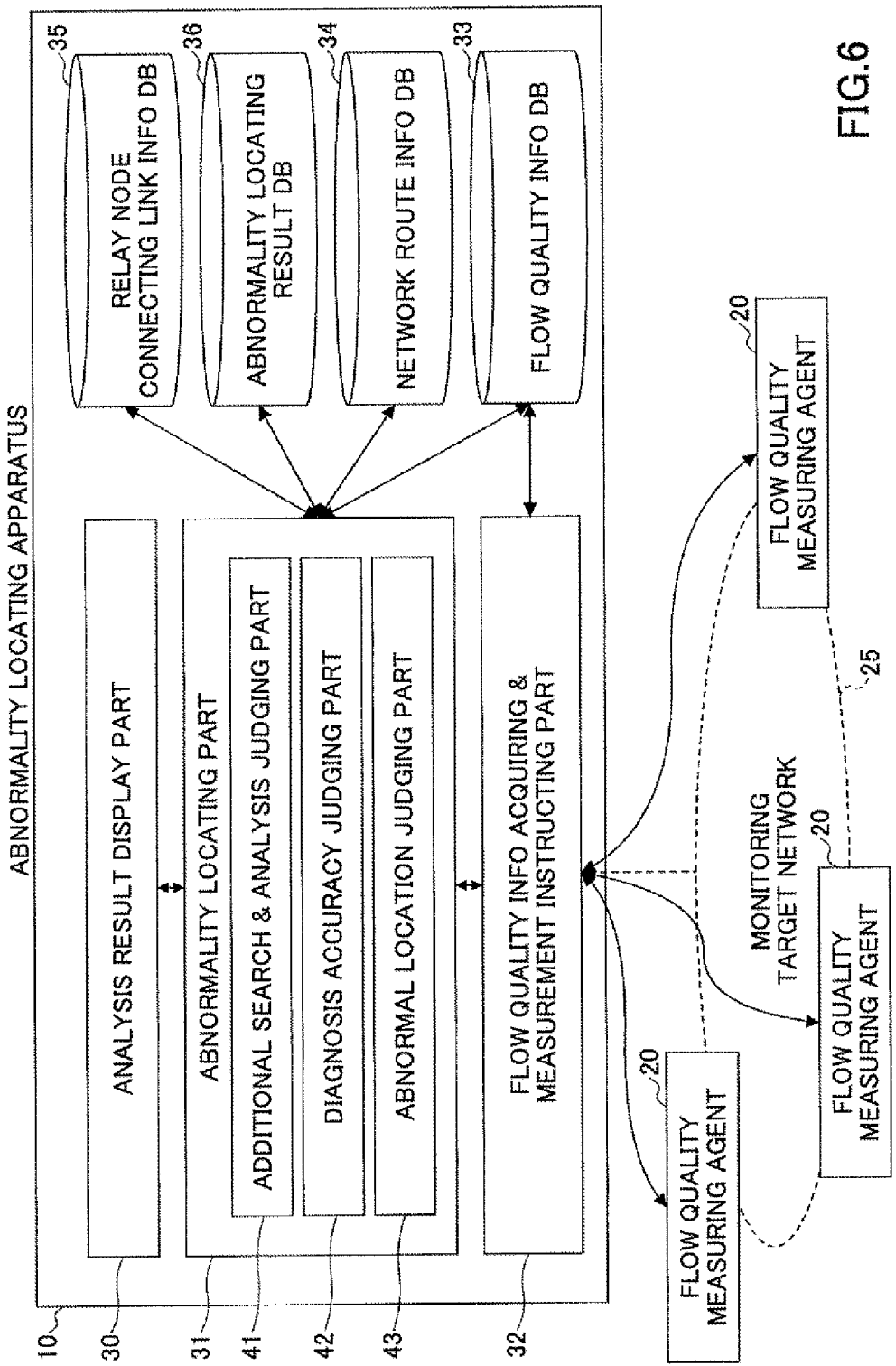
FIG. 6 is a block diagram illustrating an example of a functional structure of the abnormality locating apparatus.

FIG. 6 is a block diagram illustrating an example of a functional structure of the abnormality locating apparatus 10. The abnormality locating apparatus 10 carries out the functions of the functional blocks illustrated in FIG. 6 by executing the abnormality locating program by the APU 16.

The abnormality locating apparatus 10 illustrated in FIG. 6 includes a diagnosis result display part 30, an abnormality locating part 31, a flow quality information acquiring and measurement instructing part 32, a flow quality information database (DB) 33, a network route information database (DB) 34, a relay node connecting link information database (DB) 35, and an abnormality locating result database (DB) 36. The flow quality information DB 33, the network route information DB 34, the relay node connecting link information DB 35, and the abnormality locating result DB 36 may be formed by one or more suitable storage apparatuses.

The diagnosis result display part 30 displays a diagnosis result of an abnormal location in a monitoring target network 25 on the output device 12, a network management terminal (not illustrated) and the like. The abnormality locating part 31 locates the abnormal location of the monitoring target network 25. The flow quality information acquiring and measurement instructing part 32 acquires flow quality information from a plurality of flow quality measuring agents 20 in the monitoring target network 25, and instructs measurement of the flow quality information to the flow quality measuring agents 20.

The flow quality information DB 33 stores the flow quality information acquired by the flow quality information acquiring and measurement instructing part 32. The network route information DB 34 stores passing route information of the observation flow. The relay node connecting link information DB 35 stores the connecting link information of each relay node. The abnormality locating result DB 36 stores the result of locating the abnormal location.

The abnormality locating part 31 includes an additional search and analysis judging part 41, a diagnosis accuracy judging part 42, and an abnormal location judging part 43. The additional search and analysis judging part 41 narrows the abnormal location by carrying out the additional search and analysis when the node α exists. The diagnosis accuracy judging part 42 checks the existence of the node α from the diagnosis result, and judges whether there is a deterioration in the accuracy of the diagnosis result. The abnormal location judging part 43 judges the abnormal location from the flow quality information stored in the flow quality information DB 33 and the passing route information of the observation flow stored in the network route information DB 34, and stores the judgement result in the abnormality locating result DB 36. Although the functions of the abnormality locating apparatus 10 illustrated in FIG. 6 are realized within a single apparatus, it is of course possible to distribute the functions to be realized by the abnormality locating apparatus 10 to a plurality of processing blocks or apparatuses.

The passing route information of the observation flow stored in the network route information DB 34 may be preset by utilizing a command (trace route command or the like) from each observation point, by making a reference to a routing table or the like of the relay node within the monitoring target network 25, by monitoring and analyzing a dynamic routing protocol (for example, Open Shortest Path First (OSPF)) or, by being set manually by a network manager, for example. The method of acquiring the passing route information of the observation flow is not limited to a particular method, and any suitable method may be employed to acquire the passing route information of the observation flow.

The connecting link information of each relay node stored in the relay node connecting link information DB 34 may be preset by being generated from the passing route information of the observation flow stored in the network route information DB 34 or, by being set manually by the network manager, for example. Alternatively, the connecting link information of each relay node stored in the relay node connecting link information DB 34 may be dynamically generated by combining the passing route information of the observation flow stored in the network route information DB 34 when making a reference to the flow quality information stored in the flow quality information DB 33.

As described above, the monitoring target network 25 in this example includes the plurality of flow quality measuring agents 20 that measure the quality of the observation flow. The flow quality measuring agent 20 may be embedded in the relay node or, may be provided within an externally connected apparatus. For example, the quality of the observation flow may be measured by actively flowing measuring packets among the flow quality measuring agents 20 and measuring the measuring packets or, by monitoring user packets that flow and passively measuring the user packets.

The flow quality information that is measured is not limited to particular information, as long as it is possible to judge the abnormality or normality of the observation flow from the flow quality information. Examples of the flow quality information include a packet loss rate, delay information, jitter information, information on existence of communication, and the like. In this example, it is assumed that the flow quality measuring agent 20 is provided at each observation point.

[First Diagnosis Accuracy Judging Process]

Figure 7:
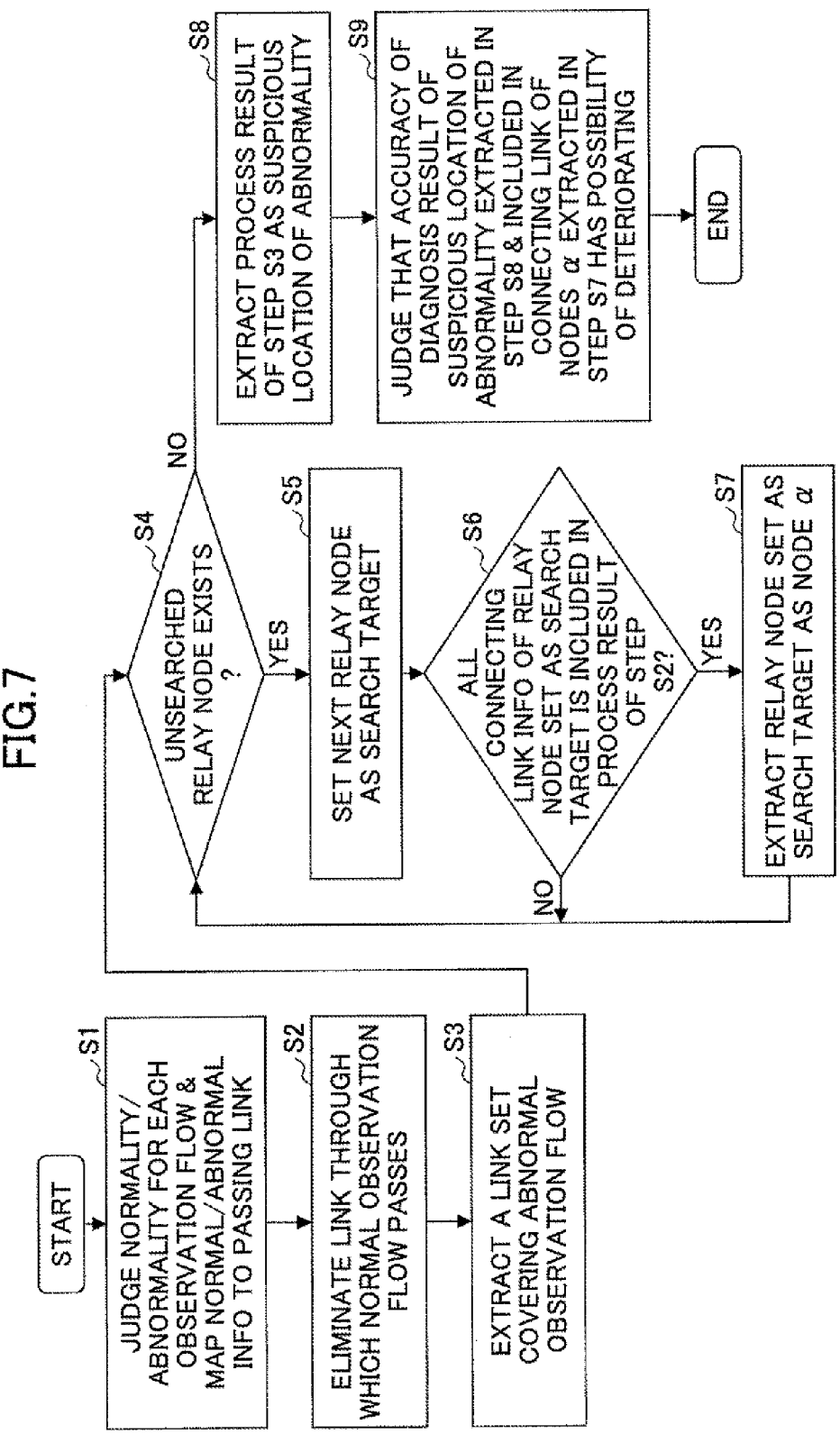
FIG. 7 is a flow chart for explaining a first diagnosis accuracy judging process of the embodiment.

FIG. 7 is a flow chart for explaining a first diagnosis accuracy judging process of this embodiment. In FIG. 7, the abnormal location judging part 43 judges the normality or abnormality for each observation flow, and maps the normal or abnormal information to the passing link, in a step S1. The abnormal location judging part 43 eliminates the link through which the normal observation flow passes, in a step S2. The abnormal location judging part 43 extracts a link set covering the abnormal observation flow, in a step S3. The steps S1 through S3 correspond to the procedures p1 through p3 of the network tomography analysis described above.

The diagnosis accuracy judging part 42 judges whether an unsearched relay node (that is, a next relay node) exists, in a step S4. If the judgement result in the step S4 is YES, the diagnosis accuracy judging part 42 sets the next relay node as the search target, in a step S5.

The diagnosis accuracy judging part 42 judges whether all connecting link information of the relay node that is set as the search target is included in the process result of the step S2 (for example, the abnormal observation flow passing link in FIG. 2), in a step S6.

If the judgement result in the step S6 is YES, the diagnosis accuracy judging part 42 extracts, as the node α, the relay node that is set as the search target, in a step S7, and the process returns to the step S4. Further, if the judgement result in the step S6 is NO, the process returns to the step S4. The steps S4 through S7 correspond to a procedure to judge whether the node α exists.

If the judgement result in the step S4 is NO, the diagnosis accuracy judging part 42 extracts the process result of the step S3 (that is, the link set covering the abnormal observation flow) as the suspicious location of the abnormality, in a step S8. The diagnosis accuracy judging part 42 judges that the accuracy of the diagnosis result of the suspicious location of the abnormality, extracted in the step S8 and included in the connecting link of one of the nodes a extracted in the step S7, has the possibility of deteriorating, in a step S9.

In FIG. 7, a judgement is made to determine whether each relay node is the node α, based on the diagnosis result of the suspicious location of the abnormality. If the node α exists, the suspicious location of the abnormality included in the diagnosis result and included in the connecting link of the node α is judged as being the diagnosis result having the accuracy that has the possibility of deteriorating.

Prior to carrying out the process illustrated in FIG. 7, the flow quality information acquiring and measurement instructing part 32 acquires the flow quality information from each of the flow quality measuring agents 20. In addition, after carrying out the process illustrated in FIG. 7, the diagnosis result display part 30 displays the diagnosis result of the abnormality locating part 31 on the output device 12, the network managing terminal or the like, for example.

[Second Diagnosis Accuracy Judging Process]

Figure 8:
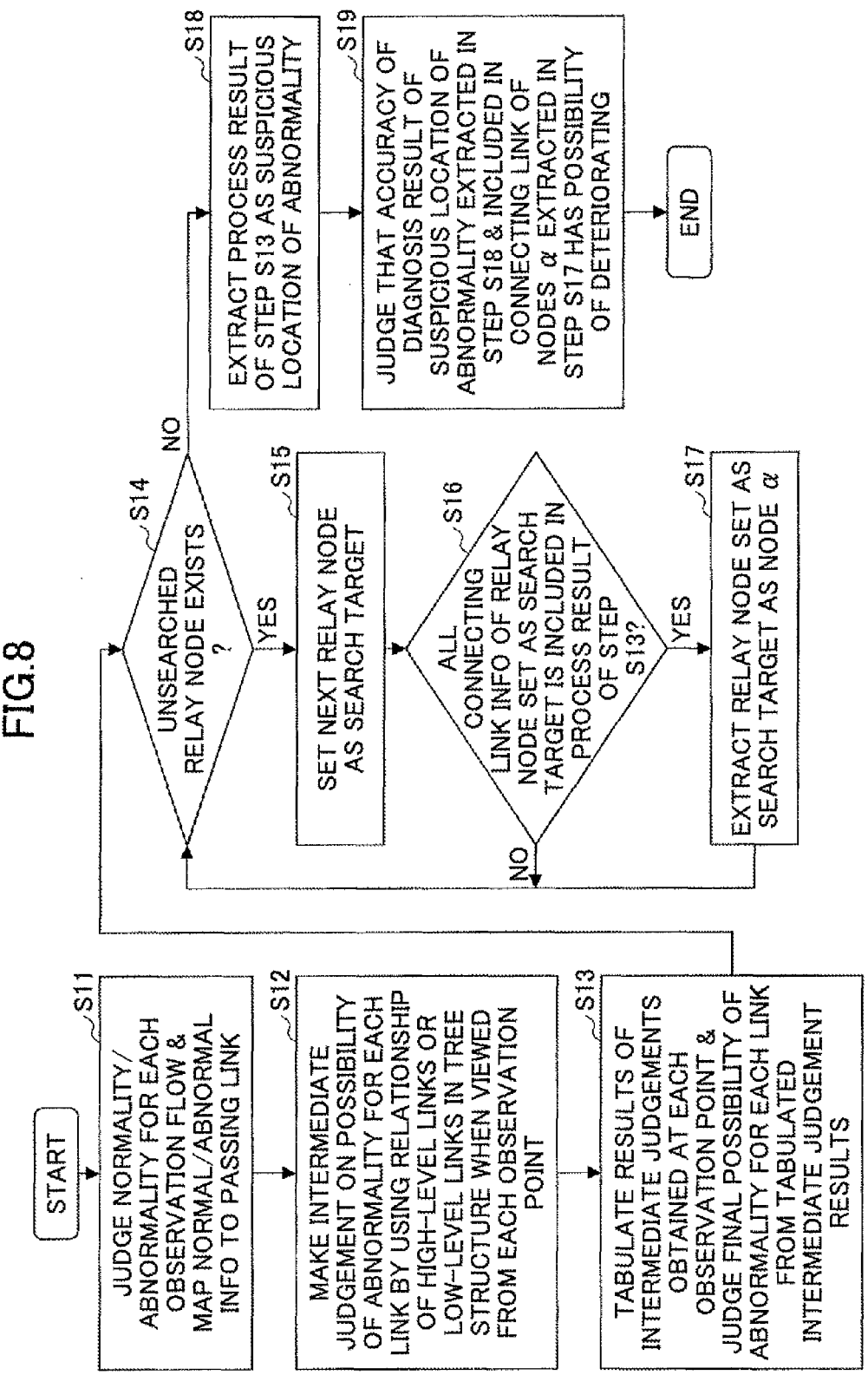
FIG. 8 is a flow chart for explaining a second diagnosis accuracy judging process of the embodiment.

FIG. 8 is a flow chart for explaining a second diagnosis accuracy judging process of this embodiment. In FIG. 8, the abnormal location judging part 43 judges the normality or abnormality for each observation flow with respect to each observation point, and maps the normal or abnormal information to the passing link, in a step S11. The abnormal location judging part 43 makes an intermediate judgement on the possibility of an abnormality of each link, by using the relationship of high-level links or low-level links in the tree structure when viewed from each observation point, in a step S12. The abnormal location judging part 43 tabulates the results of the intermediate judgments obtained at each of the observation points, and judges the final possibility of the abnormality of each link from the tabulated intermediate judgement results, in a step S13. The steps S11 through S13 correspond to the procedures P1 through P3 of the modified network tomography analysis described above.

The diagnosis accuracy judging part 42 judges whether an unsearched relay node (that is, a next relay node) exists, in a step S14. If the judgement result in the step S14 is YES, the diagnosis accuracy judging part 42 sets the next relay node as the search target, in a step S15.

The diagnosis accuracy judging part 42 judges whether all connecting link information of the relay node that is set as the search target is included in the link that is judged as having the possibility of including an abnormality in the process result of the step S13 (for example, the link having the high possibility of abnormality in FIG. 4), in a step S16.

If the judgement result in the step S16 is YES, the diagnosis accuracy judging part 42 extracts, as the node $\alpha$, the relay node that is set as the search target, in a step S17, and the process returns to the step S4. Further, if the judgement result in the step S16 is NO, the process returns to the step S14. The steps S14 through S17 correspond to a procedure to judge whether the node $\alpha$ exists.

If the judgement result in the step S14 is NO, the diagnosis accuracy judging part 42 extracts the process result of the step S12 (that is, the link having the possibility of including an abnormality) as the suspicious location of the abnormality, in a step S18. The diagnosis accuracy judging part 42 judges that the accuracy of the diagnosis result of the suspicious location of the abnormality, extracted in the step S18 and included in the connecting link of one of the nodes a extracted in the step S17, has the possibility of deteriorating, in a step S19.

In FIG. 8, a judgement is made to determine whether each relay node is the node $\alpha$, based on the diagnosis result of the suspicious location of the abnormality. If the node $\alpha$ exists, the suspicious location of the abnormality included in the diagnosis result and included in the connecting link of the node $\alpha$ is judged as being the diagnosis result having the accuracy that has the possibility of deteriorating.

Prior to carrying out the process illustrated in FIG. 8, the flow quality information acquiring and measurement instructing part 32 acquires the flow quality information from each of the flow quality measuring agents 20. In addition, after carrying out the process illustrated in FIG. 8, the diagnosis result display part 30 displays the diagnosis result of the abnormality locating part 31 on the output device 12, the network managing terminal or the like, for example.

[First Measuring and Analyzing Process]

Figure 9:
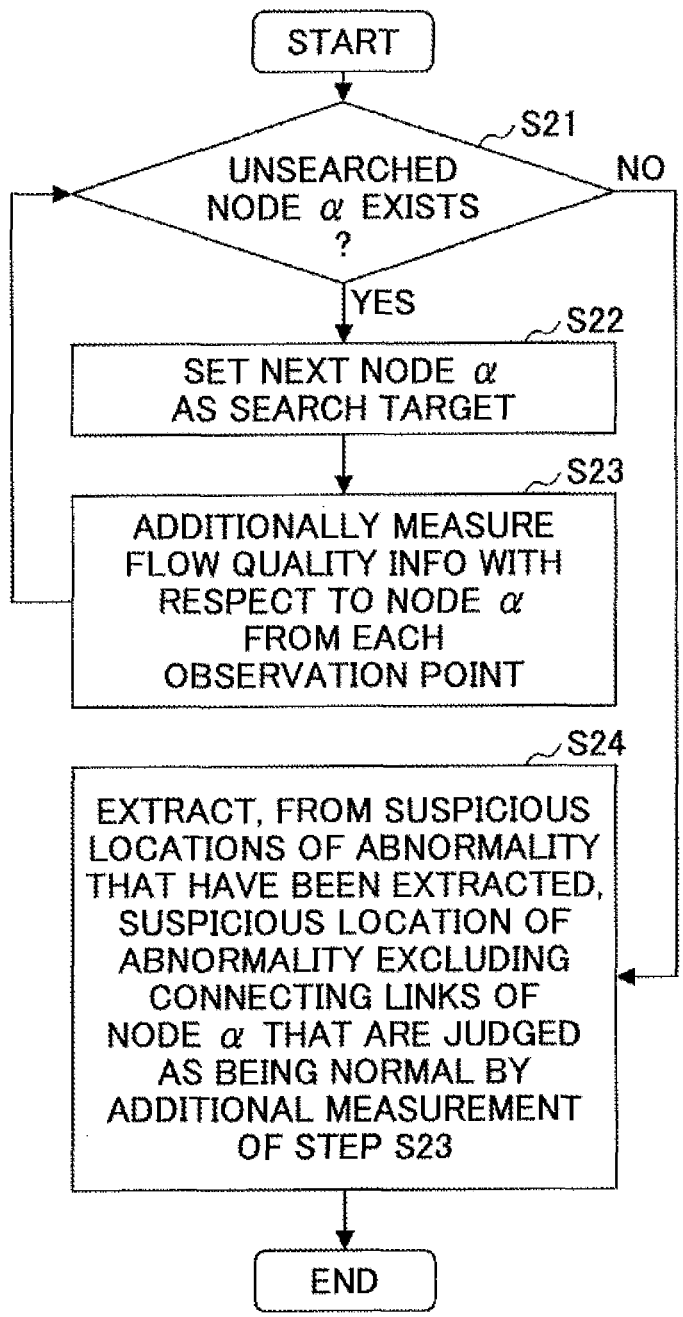
FIG. 9 is a flow chart for explaining a first measuring and analyzing process of the embodiment.

FIG. 9 is a flow chart for explaining a first measuring and analyzing process of this embodiment. In FIG. 9, the additional search and analysis judging part 41 judges whether an unsearched node $\alpha$ exists, in a step S21. If the judgement result in the step S21 is YES, the additional search and analysis judging part 41 sets the next node $\alpha$ as the search target, in a step S22. The additional search and analysis judging part 41 uses the flow quality information acquiring and measurement instructing part 32 to additionally measure the flow quality information with respect to the node $\alpha$ from each observation point, in a step S23, and the process returns to the step S21.

On the other hand, if the judgement result in the step S21 is NO, the additional search and analyzing part 41 extracts from the suspicious locations of the abnormality that have been extracted the suspicious location of the abnormality excluding the connecting links of the node $\alpha$ that are judged as being normal by the additional measurement of the flow quality information carried out in the step S23, in a step S24.

The process illustrated in FIG. 9 thus shows a method of carrying out the additional search between the observation point and the node $\alpha$. Prior to carrying out the process illustrated in FIG. 9, it is a precondition that the existence of the node a has been judged.

The process illustrated in FIG. 9 instructs the additional measurement of the flow quality information with respect to the relay node that is judged as being the node $\alpha$ from each observation point. Amongst the suspicious locations of the abnormality extracted by the process illustrated in FIG. 9, the suspicious locations of the abnormality excluding the connecting links of the node $\alpha$ that are judged as being normal by the additional measurement of the flow quality information are extracted as the suspicious locations of the abnormality after the narrowing. After carrying out the process illustrated in FIG. 9, the diagnosis result display part 30 displays the suspicious locations of the abnormality after the narrowing on the output device 12, the network managing terminal or the like, for example.

[Second Measuring and Analyzing Process]

Figure 10:
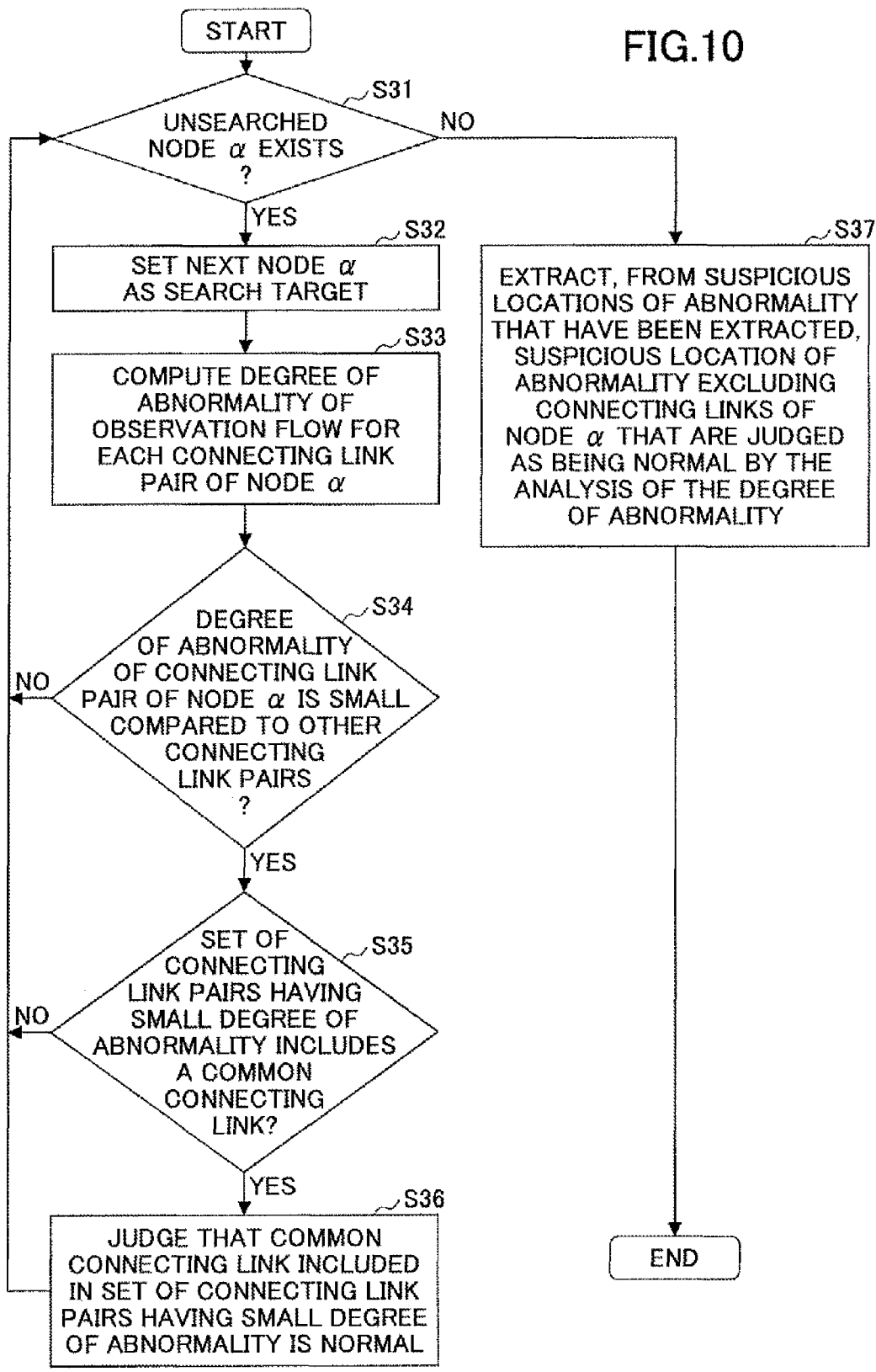
FIG. 10 is a flow chart for explaining a second measuring and analyzing process of the embodiment.

FIG. 10 is a flow chart for explaining a second measuring and analyzing process of this embodiment. In FIG. 10, the additional search and analysis judging part 41 judges whether an unsearched node $\alpha$ exists, in a step S31. If the judgement result in the step S31 is YES, the additional search and analysis judging part 41 sets the next node $\alpha$ as the search target, in a step S32. The additional search and analysis judging part 41 computes the degree of abnormality of the observation flow for each connecting link pair of the node $\alpha$ (that is, for each observation flow passing link pair of the connecting links of the node $\alpha$), in a step S33. The additional search and analysis judging part 41 judges whether the degree of abnormality of a connecting link pair of the node $\alpha$ is small compared to those of other connecting link pairs of the node $\alpha$, in a step S34.

If the judgement result in the step S34 is YES, the additional search and analysis judging part 41 judges whether a set of the connecting link pairs having the small degree of abnormality includes a common connecting link, in a step S35. If the judgement result in the step S35 is YES, the additional search and analysis judging part 41 judges that the common connecting link included in the set of connecting link pairs having the small degree of abnormality is normal, in a step s36, and the process returns to the step S31.

On the other hand, the process also returns to the step S31 if the judgement result in the step S34 is NO. The process also returns to the step S31 if the judgement result in the step S35 is NO.

If the judgement result in the step S31 is NO, the additional search and analysis judging part 41 extracts from the suspicious locations of the abnormality that have been extracted the suspicious location of the abnormality excluding the connecting links of the node $\alpha$ that are judged as being normal by the analysis of the degree of abnormality carried out by the steps S33 through S36, in a step S37.

The process illustrated in FIG. 10 thus shows a method of analyzing the degree of abnormality of the observation flow passing through the node $\alpha$. Prior to carrying out the process illustrated in FIG. 10, it is a precondition that the existence of the node $\alpha$ has been judged.

The process illustrated in FIG. 10 computes the degree of abnormality of the observation flow for each connecting link pair of the node $\alpha$. Amongst the suspicious locations of the abnormality extracted by the process illustrated in FIG. 10, the suspicious locations of the abnormality excluding the connecting links of the node $\alpha$ that are judged as being normal by the analysis of the degree of abnormality are extracted as the suspicious locations of the abnormality after the narrowing. After carrying out the process illustrated in FIG. 10, the diagnosis result display part 30 displays the suspicious locations of the abnormality after the narrowing on the output device 12, the network managing terminal or the like, for example.

Next, a description will be given of an example of the monitoring target network 25 that is formed by the network illustrated in FIG. 1, for example. The network illustrated in FIG. 1 includes flow quality measuring agents A through E, relay nodes R1 through R6, and links 1 through 12. It is assumed for the sake of convenience that the abnormalities are simultaneously generated in the links 2 and 5.

In the following description, it is assumed for the sake of convenience that the network illustrated in FIG. 1 actively flows the measuring packets among the flow quality measuring agents A through E, and periodically measures the quality of the observation flow among the flow quality measuring agents A through E. However, the method of measuring the quality of the observation flow is of course not limited to such a method. For example, user packets flowing through the flow quality measuring agents A through E may be passively measured to measure the quality of the observation flow.

Furthermore, in the following description, it is a precondition that the measuring target for the quality of the observation flow is the packet loss rate and the Round Trip Time (RTT), however, the measuring target is of course not limited to such information. For example, the measuring target of for the quality of the observation flow may include a one-way delay, a jitter, a blackout (or blocking), or the like.

First Example of Embodiment

In a first example of the embodiment, the existence of the node α is judged, and a judgement and a display is made on the possibility that the accuracy of the diagnosis will deteriorate.

[Network Route Information DB 34]

FIG. 11 is a diagram illustrating an example of information stored in the network route information DB 34. The network route information DB 34 of the abnormality locating apparatus 10 stores the passing route information in correspondence with each pair formed by source information of the observation flow (or source observation point) and destination information.

Figure 1:
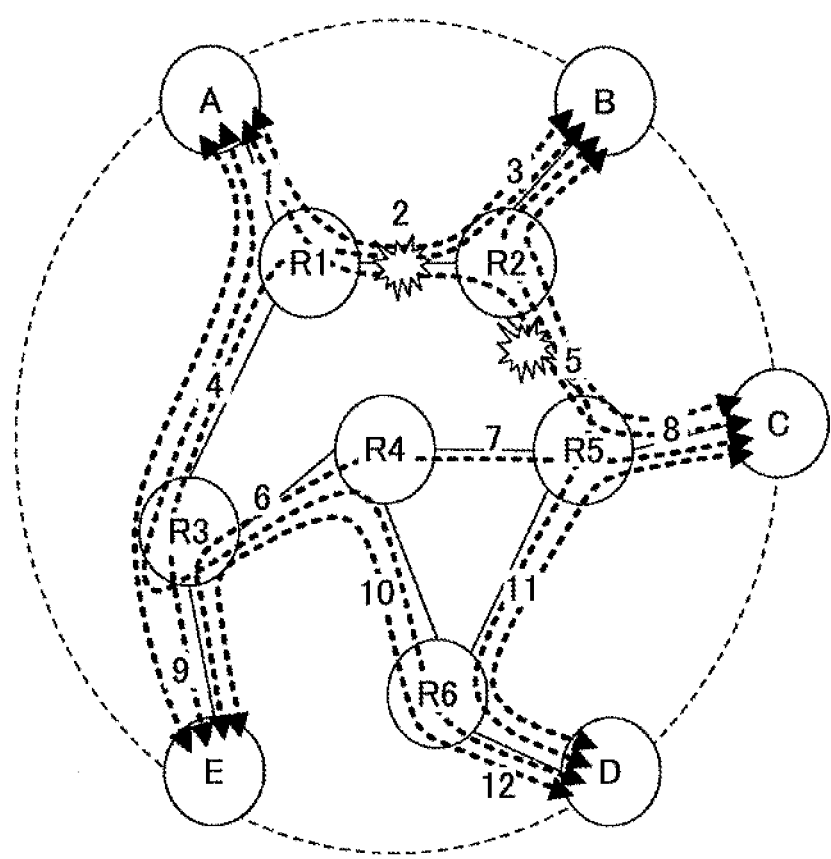
FIG. 1 is a diagram illustrating an example of a network in which an abnormality is to be located.

In the case of the network illustrated in FIG. 1, the network route information DB 34 stores information indicating that the observation flow from the source observation point A to the end observation point B, for example, passes through a route "(observation point A)→(relay node R1)→(relay node R2)→(observation point B)".

When carrying out the additional search between the observation point and the node α, the network route information DB 34 illustrated in FIG. 11 also requires the route information between the observation point and the relay node. When not carrying out the additional search between the observation point and the node α, the network route information DB 34 illustrated in FIG. 11 does not require the route information between the observation point and the relay node. Although the network route information DB 34 illustrated in FIG. 11 stores the passing route by the hop of the relay nodes R1 through R6, it is of course possible to store the passing route by the hop of the links 1 through 12.

The network route information DB 34 illustrated in FIG. 11 stores the network route information among all of the observation points A through E in a single table. However, instead of storing the network route information among all of the observation points A through E in a single table, it is possible to independently manage route information of the relay nodes R1 through R6 in routing tables, and to extract, if necessary, the network route information among the observation points A through E from a combination of route information of the routing tables.

The passing route information among the observation points A through E may be acquired by utilizing commands from the observation points A through E, by referring to the routing tables or the like within the relay nodes R1 through R6 in the monitoring target network 25 or, by monitoring and analyzing the dynamic routing protocol flowing within the monitoring target network 25, for example. The method of acquiring the passing route information among the observation points A through E is not limited to a particular method.

[Flow Quality Information DB 33]

FIG. 12 is a diagram illustrating an example of flow quality information stored in the flow quality information DB 33 when the packet loss is the measuring target for flow quality information. The flow quality information acquiring and measurement instructing part 32 of the abnormality locating apparatus 10 acquires the measured result of the quality of the observation flow measured at each observation point (that is, each of the flow quality measuring agents A through E). When the flow quality information acquiring and measurement instructing part 32 acquires the measured result of the quality of the observation flow, the flow quality information acquiring and measurement instructing part 32 stores the source information of the observation flow (or source observation point), the destination information, and the quality information (for example, the packet loss rate) in the flow quality information DB 33.

In the case of the network illustrated in FIG. 1, the packet loss is not observed for the quality information observed at the source observation point A with respect to the passing routes of the observation flows AD and AE to the end observation points D and E because these passing routes have no link in which the abnormality is generated. On the other hand, the packet loss is observed for the quality information observed at the source observation point A with respect to the passing routes of the observation flows AB and AC to the end observation points B and C because these passing routes have a link in which the abnormality is generated.

The flow quality information DB 33 illustrated in FIG. 12 stores the flow quality information of all of the observation points A through E in a single table. However, the flow quality information of the observation points A through E may be stored in separate tables respectively provided with respect to the observation points A through E. In addition, although the flow quality information DB 33 illustrated in FIG. 12 stores the packet loss as the quality information, it is of course possible to store a total number of measured packets and a total number of packet losses prior to the computation of the packet loss rate.

Furthermore, the flow quality information DB 33 may store results of judging the normality or abnormality of the observation flow (that is, flow abnormality judgement results), as illustrated in FIG. 12. When storing the results of judging the normality or abnormality of the observation flow in the flow quality information DB 33, a flow abnormality judging threshold value may be set to 0.5%, for example, as illustrated in FIG. 12, in order to judge the normality or abnormality of the observation flow with reference to this flow abnormality judging threshold value.

FIG. 13 is a diagram illustrating an example of the flow quality information stored in the flow quality information DB 33 when the RTT is the measuring target for flow quality information. The flow quality information acquiring and measurement instructing part 32 of the abnormality locating apparatus 10 acquires the measured result of the quality of the observation flow measured at each observation point (that is, each of the flow quality measuring agents A through E). When the flow quality information acquiring and measurement instructing part 32 acquires the measured result of the quality of the observation flow, the flow quality information acquiring and measurement instructing part 32 stores the source information of the observation flow (or source observation point), the destination information, and the quality information (for example, the RTT) in the flow quality information DB 33.

In the case of the network illustrated in FIG. 1, a relatively short RTT is observed for the quality information observed at the source observation point A with respect to the passing routes of the observation flows AD and AE to the end observation points D and E because these passing routes have no link in which the abnormality is generated. On the other hand, a relatively long RTT is observed for the quality information observed at the source observation point A with respect to the passing routes of the observation flows AB and AC to the end observation points B and C because these passing routes have a link in which the abnormality is generated.

The flow quality information DB 33 illustrated in FIG. 13 stores the flow quality information of all of the observation points A through E in a single table. However, the flow quality information of the observation points A through E may be stored in separate tables respectively provided with respect to the observation points A through E.

In addition, the flow quality information DB 33 may store results of judging the normality or abnormality of the observation flow (that is, flow abnormality judgement results), as illustrated in FIG. 13. When storing the results of judging the normality or abnormality of the observation flow in the flow quality information DB 33, a flow abnormality judging threshold value may be set to 100 msec, for example, as illustrated in FIG. 13, in order to judge the normality or abnormality of the observation flow with reference to this flow abnormality judging threshold value. Furthermore, when storing the results of judging the normality or abnormality of the observation flow in the flow quality information DB 33, a flow abnormality judging threshold value may be dynamically computed from statistics of past time-sequential measured data for each observation flow, for example, in order to judge the normality or abnormality of the observation flow with reference to this flow abnormality judging threshold value. In this case, the flow abnormality judging threshold value may be dynamically computed from $\mu+2\sigma$, for example, where $\mu$ denotes the average of the measured data and $\sigma$ denotes the standard deviation.

[Relay Node Connecting Link Information DB 35]

FIG. 14 is a diagram illustrating an example of information stored in the relay node connecting link information DB 35. The relay node connecting link information DB 35 stores connecting link information in correspondence with each relay node information, as illustrated in FIG. 14. In the case of the network illustrated in FIG. 1, the relay node connecting link information DB 35 stores information indicating that the relay node R1 connects to the links 1, 2 and 4, for example.

The connecting link information corresponding to each relay node information may be generated from the passing route information stored in the network route information DB 34 or, preset by a manual setting made by the network manager or, dynamically generated in combination with the passing route information stored in the network route information DB 34 when referring to the flow abnormality judgement results stored in the flow quality information DB 33.

[Judging Existence of Node α]

When the steps S1 and S2 illustrated in FIG. 7 are carried out in the network illustrated in FIG. 1, the abnormal location judging part 43 creates the matrix diagram illustrated in FIG. 2. Then, the diagnosis accuracy judging part 42 utilizes the relay node connecting link information DB 35 illustrated in FIG. 14, for example, in order to make an analysis to determine whether all connecting links are abnormal flow passing links illustrated in FIG. 2, for each of the relay nodes R1 through R6, and to judge that the relay node having all connecting links thereof that are the abnormal flow passing links is the node α.

FIG. 15 is a diagram illustrating an example of a structure of the relay node connecting link information DB 35, indicating the abnormal flow passing links by a bold solid rectangular mark. For example, the relay node R1 includes the connecting links 1, 2 and 4, however, the connecting links 1 and 4 that are not encircled by the bold solid rectangular mark are not abnormal flow passing links of FIG. 2 and thus, the relay node R1 will not be judged as being the node α. On the other hand, the relay node R2 includes the connecting links 2, 3 and 5, and because all of the connecting links 2, 3 and 5 are encircled by the bold solid rectangular mark and are abnormal flow passing links of FIG. 2, the relay node R2 will be judged as being the node α.

When the analysis is made to determine whether all connecting links are abnormal flow passing links illustrated in FIG. 2 with respect to all relay nodes, the relay node R2 is extracted as the node α in the case of the network illustrated in FIG. 1. Next, the diagnosis accuracy judging part 42 judges that the accuracy of the diagnosis has a possibility of deteriorating for the suspicious location of the abnormality with respect to the connecting links 2, 3 and 5 of the node α, from among the extracted suspicious locations of the abnormality. The diagnosis accuracy judging part 42 utilizes the diagnosis result display part 30, and displays, as the diagnosis result, the possibility that the accuracy of the diagnosis of the connecting links 2, 3 and 5 will deteriorate, on the network managing terminal or the like, for example.

In addition, when the steps S11 through S13 illustrated in FIG. 8 are carried out in the network illustrated in FIG. 1, the abnormal location judging part 43 creates the final abnormality judgement results of the links illustrated in FIG. 4, for example.

Next, the diagnosis accuracy judging part 42 utilizes the relay node connecting link information DB 35 illustrated in FIG. 14, for example, and makes an analysis to determine whether all connecting links are the links having the possibility of including abnormality as illustrated in FIG. 4, for each of the relay nodes R1 through R6, and judges that the relay node is the node α if all connecting links thereof are the links having the possibility of including the abnormality.

FIG. 16 is a diagram illustrating an example of a structure of the relay node connecting link information DB 35, indicating the links having a possibility of including an abnormality by a bold solid rectangular mark. For example, the connecting links 1 and 4 of the relay node R1, among the connecting links 1, 2 and 4 of the relay node R1, do not have the possibility of including the abnormality. Hence, the relay node R1 will not be judged as being the node α. On the other hand, all of the connecting links 2, 3 and 5 of the relay node R2 have the possibility of including the abnormality, as illustrated in FIG. 4, and thus, the relay node R2 is judged as being the node α.

When the analysis is made to determine whether all connecting links have the possibility of being the links including the abnormality as illustrated in FIG. 4 with respect to all relay nodes, the relay node R2 is extracted as the node α in the case of the network illustrated in FIG. 1. Next, the diagnosis accuracy judging part 42 judges that the accuracy of the diagnosis has a possibility of deteriorating for the suspicious location of the abnormality with respect to the connecting links 2, 3 and 5 of the node α, from among the extracted suspicious locations of the abnormality. The diagnosis accuracy judging part 42 utilizes the diagnosis result display part 30, and displays, as the diagnosis result, the possibility that the accuracy of the diagnosis of the connecting links 2, 3 and 5 will deteriorate, on the network managing terminal or the like, for example.

Second Example of Embodiment

A second example of this embodiment narrows and displays the suspicious location of the abnormality by carrying out the additional search and diagnosis, when the existence of the node α is judged and the node α exists. The process up to the judgement to determine whether the node α exists is the same as that of the first example of this embodiment. When the node α exists, the second example of this embodiment not only judges that the accuracy of the diagnosis has a possibility of deteriorating, but also makes the additional search and diagnosis, in order to narrow the suspicious location of the abnormality and to improve the accuracy of the diagnosis.

[Additional Search and Diagnosis Between Observation Point and Node α]

Figure 17:
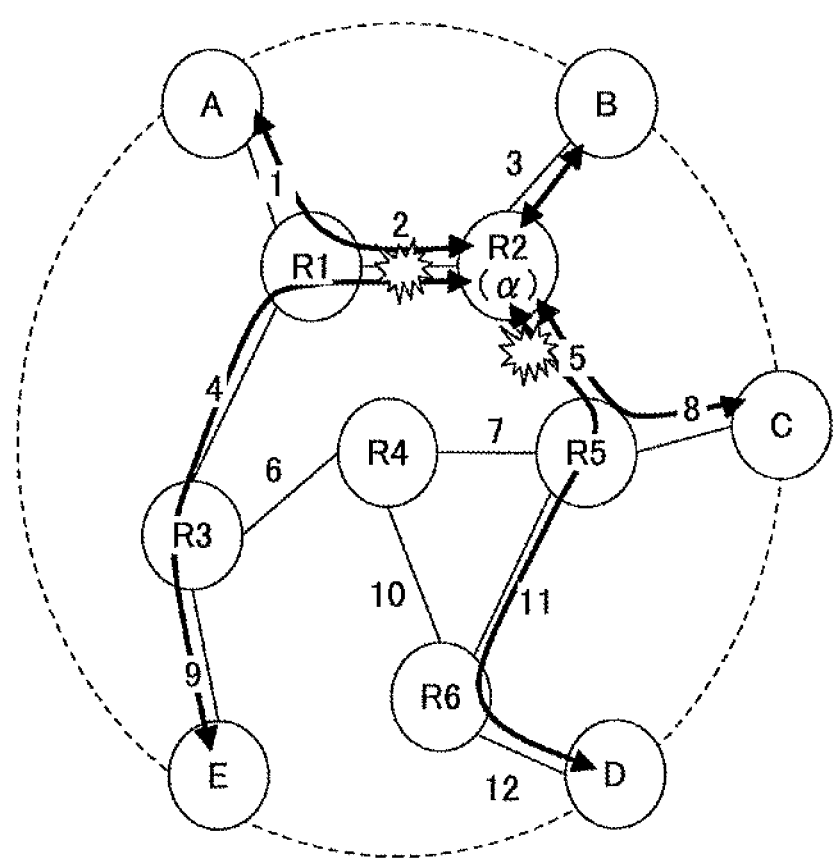
FIG. 17 is a diagram for explaining measurement of the flow quality information by each observation point with respect to a relay node that is a node α.

It is assumed for the sake of convenience that the relay node R2 is extracted as the node α in this example. The additional search and analysis judging part 41 utilizes the flow quality information acquiring and measurement instructing part 32, and instructs additional measurement of the flow quality information with respect to each observation point to the relay node R2 that is the node α. Each observation point measures the flow quality information with respect to the relay node R2, as illustrated in FIG. 17. FIG. 17 is a diagram for explaining the measurement of the flow quality information by each observation point with respect to the relay node R2 that is the node α. In FIG. 17, those parts that are the same as those corresponding parts in FIG. 1 are designated by the same reference numerals, and a description thereof will be omitted.

The flow quality information acquiring and measurement instructing part 32 of the abnormality locating apparatus 10 acquires the measured result of the flow quality information. FIG. 18 is a diagram illustrating an example of the information stored in the network route information DB 34 illustrated in FIG. 11, indicating the connecting link of the relay node R2 that is the check target node α by a bold solid rectangular mark. FIG. 18 illustrates only a part of the information stored in the network route information DB 34 illustrated in FIG. 11.

The additional search and analysis judging part 41 judges from the passing route information stored in the network route information DB 34 the connecting link of the relay node R2 through which the observation flow (additional observation flow) of the flow quality information passes. The additional search and analysis judging part 41 relates the connecting link through which the additional observation flow passes to the measured result of the flow quality information, and holds the measured results of the additional search as illustrated in FIG. 19.

FIG. 19 is a diagram illustrating an example of the measured results obtained by the additional search. The abnormality of the additional observation flow is judged similarly to the judgement of the abnormality of the flow quality information DB 33 described above. For example, in the measured results of the additional search in FIG. 19, it is judged that the additional search between the observation point A and the relay node R2 passes through the connecting link 2 and is abnormal, and that the additional search between the observation point B and the relay node R2 passes through the connecting link 3 and is normal. The judgement to determine the normality or abnormality may be made similarly with respect to the other observation points C, D and E.

From the measured results of the additional search illustrated in FIG. 19, the additional search and analysis judging part 41 judges that the connecting links 2 and 5, excluding the connecting link 3, among the connecting links 2, 3 and 5 of the relay node R2 that is the node α are the narrowed suspicious locations of the abnormality. The additional search and analysis judging part 41 utilizes the diagnosis result display part 30, and displays, as the narrowed suspicious locations of the abnormality, the connecting links 2 and 5, on the network managing terminal or the like, for example.

In the examples of the process of making the additional search and diagnosis between the observation point and the node α in FIGS. 17 through 19, the additional search and diagnosis are made with respect to the node α from all of the observation points. However, the observation points from which the additional search and diagnosis are to be made may be narrowed.

Suppose, for example, that the relay node R2 is extracted as the node α. In this case, the additional search and analysis judging part 41 judges from the passing route information stored in the network route information DB 34 illustrated in FIG. 18 the connecting link of the relay node R2 through which the additional observation flow passes, in order to extract the set of observation points from which all of the connecting links of the relay node R2 are to be passed. In the case of the passing route information stored in the network route information DB 34 illustrated in FIG. 18, the observation points A, B and C are extracted as the set of observation points.

Figure 20:
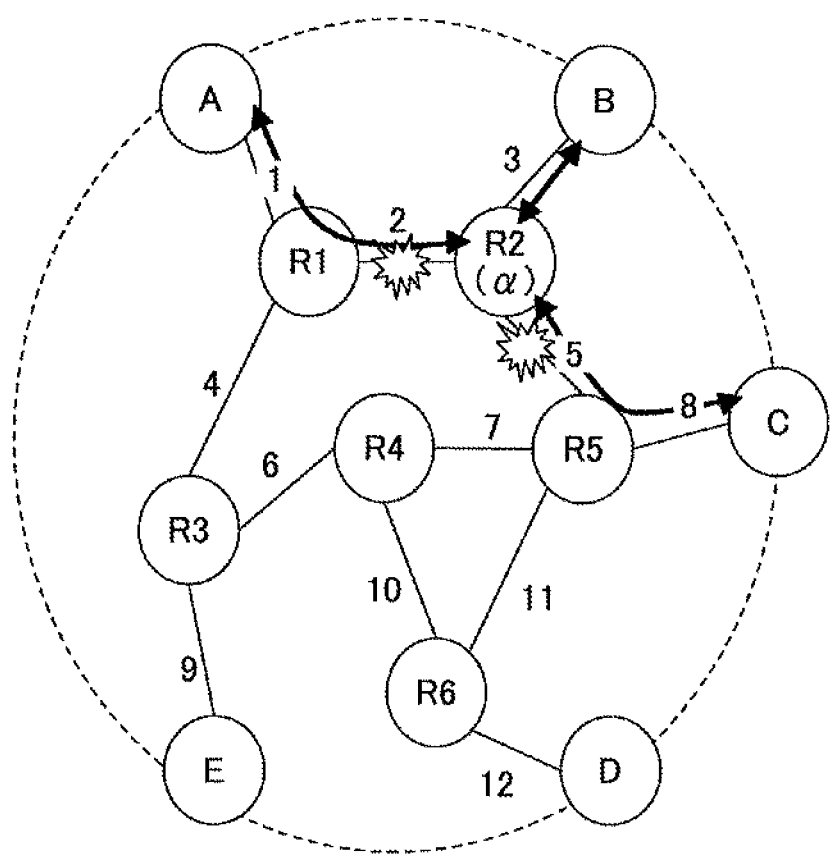
FIG. 20 is a diagram for explaining an additional measurement of the flow quality information from observation points A, B and C with respect to a relay node R2.

The additional search and analysis judging part 41 utilizes the flow quality information acquiring and measurement instructing part 32 to instruct the additional measurement of the flow quality information from the extracted set of observation points A, B and C with respect to the relay node R2 that is the node α. The observation points A, B and C carry out the additional measurement of the flow quality information with respect to the relay node R2, as illustrated in FIG. 20. FIG. 20 is a diagram for explaining the additional measurement of the flow quality information from the observation points A, B and C with respect to the relay node R2. In FIG. 20, those parts that are the same as those corresponding parts in FIG. 1 are designated by the same reference numerals, and a description thereof will be omitted.

The flow quality information acquiring and measurement instructing part 32 of the abnormality locating apparatus 10 acquires the measured results of the flow quality information obtained from the additional measurement. The additional search and analysis judging part 41 relates the connecting links through which the additional observation flow passes and the measured results of the flow quality information, and holds the measured results of the additional search as illustrated in FIG. 21.

FIG. 21 is a diagram illustrating an example of the measured results obtained by the additional search. The judgement to determine the abnormality of the additional observation flow is made similarly to the judgement to determine the abnormality of the flow quality information DB 33 described above. For example, in the measured results of the additional search illustrated in FIG. 21, the additional search between the observation point A and the relay node R2 passes through the connecting link 2 and is judged as being abnormal, while the additional search between the observation point B and the relay node R2 passes through the connecting link 3 and is judged as being normal. The additional search between the observation point C and the relay node C passes through the connecting link 5 an is judged as being abnormal.

From the measured results of the additional search illustrated in FIG. 21, the additional search and analysis judging part 41 judges that judges that the connecting links 2 and 5, excluding the connecting link 3, among the connecting links 2, 3 and 5 of the relay node R2 that is the node α are the narrowed suspicious locations of the abnormality. The additional search and analysis judging part 41 utilizes the diagnosis result display part 30, and displays, as the narrowed suspicious locations of the abnormality, the connecting links 2 and 5, on the network managing terminal or the like, for example.

In the procedure described above, it is assumed that the set of observation points that are instructed to make the additional search are extracted first. However, it is of course possible to employ a procedure which successively judges the observation points that are instructed to make the additional search while judging whether the connecting links of the relay node R2 already instructed to make the additional search will be passed. In addition, the flow quality is not limited to the packet loss rate, and the flow quality may be the RTT, the one-way delay, the jitter, the blackout (or blocking), or the like.

[Example of Analyzing and Diagnosing Degree of Abnormality of Observation Flow Passing Through Node α]

It is assumed in this example that the relay node R2 is extracted as the node α. FIG. 22 is a diagram illustrating an example of information stored in the network route information DB 34, indicating pairs of connecting links of the relay node R2 that is the node α through which the observation flow passes (that is, connecting link passing pairs) by a bold solid rectangular mark. FIG. 22 illustrates only a part of the information stored in the network route information DB 34 illustrated in FIG. 11.

Figure 23:
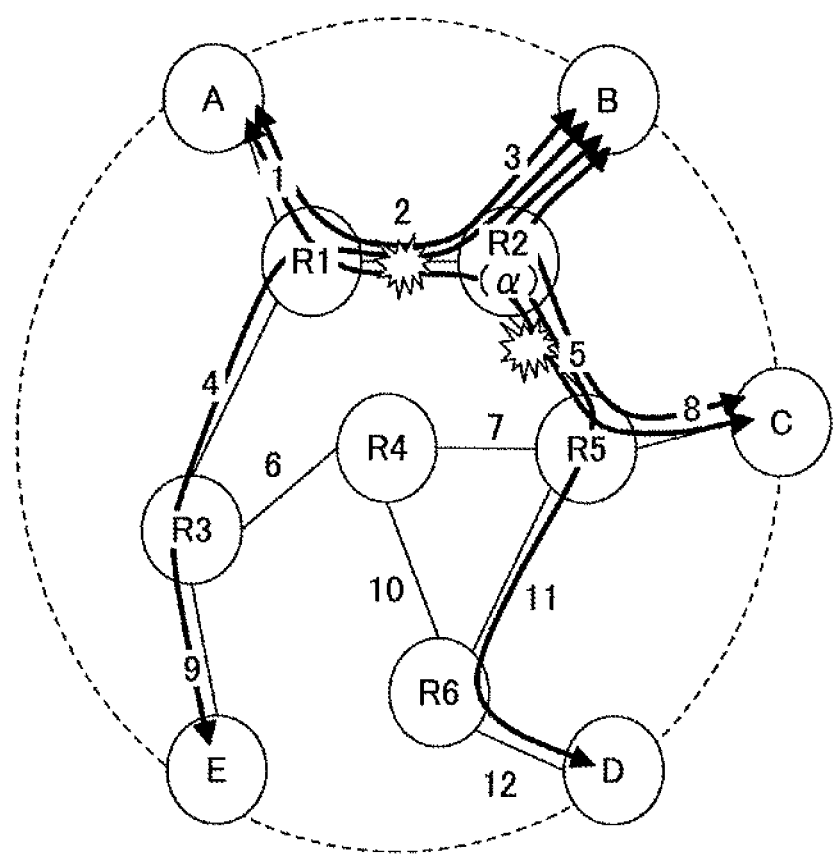
FIG. 23 is a diagram for explaining the observation flow passing through the relay node R2.

The additional search and analysis judging part 41 judges the connecting link passing pair of each observation flow passing through the relay node R2 illustrated in FIG. 23. FIG. 23 is a diagram for explaining the observation flow passing through the relay node R2. In FIG. 23, those parts that are the same as those corresponding parts in FIG. 1 are designated by the same reference numerals, and a description thereof will be omitted. The additional search and analysis judging part 41 computes the degree of abnormality for each connecting link passing pair from the quality information stored in the flow quality information DB 33 illustrated in FIG. 24. FIG. 24 is a diagram illustrating a part of the information stored in the flow quality information DB 33 illustrated in FIG. 12 and related to this example.

According to the information stored in the network route information DB 34 illustrated in FIG. 22, the observation flow between the observation points A and B and the observation flow between the observation points B and E pass through the connecting link passing pair of the connecting links 2 and 3, the observation flow between the observation points A and C passes through the connecting link passing pair of the connecting links 2 and 5, and the observation flow between the observation points B and C and the observation flow between the observation points B and D pass through the connecting link passing pair of the connecting links 3 and 5, for example.

The additional search and analysis judging part 41 computes an average packet loss rate of 1.0% of the observation flow between the observation points A and B and the observation flow between the observation points B and E passing through the connecting link passing pair of the connecting links 2 and 3, from the quality information stored in the flow quality information DB 33 illustrated in FIG. 24.

In addition, the additional search and analysis judging part 41 computes an average packet loss rate of 2.0% of the observation flow between the observation points A and C passing through the connecting link passing pair of the connecting links 2 and 5, from the quality information stored in the flow quality information DB 33 illustrated in FIG. 24.

Further, the additional search and analysis judging part 41 computes an average packet loss rate of 1.0% of the observation flow between the observation points B and C and the observation flow between the observation points B and D passing through the connecting link passing pair of the connecting links 3 and 5, from the quality information stored in the flow quality information DB 33 illustrated in FIG. 24.

Next, the additional search and analysis judging part 41 compares the computed average packet loss rates as respectively corresponding to the degree of abnormality of each observation flow. In this example, the additional search and analysis judging part 41 judges that the degree of abnormality of the observation flow simultaneously passing the connecting links 2 and 3 and the degree of abnormality of the observation flow simultaneously passing through the connecting links 3 and 5 are small compared to the degree of abnormality of the observation flow simultaneously passing through the connecting links 2 and 5. The additional search and analysis judging part 41 also extracts the connecting link 3 as the common link common to the connecting link passing pair of the connecting links 2 and 3 and the connecting link passing pair of the connecting links 3 and 5.

The degree of abnormality of the connecting link 3 is small compared to that of other connecting links. Hence, among the connecting links 2, 3 and 5 of the relay node R2 that is the node α, the connecting links 2 and 5, excluding the link 3, are judged as being the narrowed suspicious locations of the abnormality. The additional search and analysis judging part 41 utilizes the diagnosis result display part 30, and displays, as the narrowed suspicious locations of the abnormality, the connecting links 2 and 5, on the network managing terminal or the like, for example.

In the above described process of analyzing and diagnosing the degree of abnormality of the observation flow passing through the node α, the degree of abnormality is compared for each connecting link passing pair of the node α. However, it is of course possible to compare the degree of abnormality for each connecting link of the node α, as in an example described in the following. In the following example, it is assumed for the sake of convenience that the relay node R2 is already extracted as the node α.

First, the additional search and analysis judging part 41 judges the connecting links of the relay node R2 through which each observation flow passing through the relay node R2 passes, from the information stored in the network route information DB 34 illustrated in FIG. 22, in order to compute the degree of abnormality for each connecting link.

According to the information stored in the network route information DB 34 illustrated in FIG. 22, the observation flow between the observation points A and B, the observation flow between the observation points A and C, and the observation flow between the observation points B and E pass through the connecting link 2. In addition, the observation flow between the observation points A and B, the observation flow between the observation points B and C, the observation flow between the observation points B and E, and the observation flow between the observation points B and E pass through the connecting link 3. Further, the observation flow between the observation points A and C, the observation flow between the observation points B and C, and the observation flow between the observation points B and D pass through the connecting link 5.

The additional search and analysis judging part 41 also computes the average packet loss rate of 1.33% of the observation flows passing through the connecting link 2, the average packet loss rate of 1.00% of the observation flows passing through the connecting link 3, and the average packet loss rate of 1.33% of the observation flows passing through the connecting link 5, from the quality information stored in the flow quality information DB 33 illustrated in FIG. 24.

Next, the additional search and analysis judging part 41 compares the computed average packet loss rates as respectively corresponding to the degree of abnormality of each observation flow. In this example, the additional search and analysis judging part 41 judges that the degree of abnormality of the observation flow passing the connecting link 3 is small compared to the degrees of abnormality of the observation flows passing through the connecting links 2 and 5, and extracts the connecting link 3.

The degree of abnormality of the connecting link 3 is small compared to that of other connecting links. Hence, among the connecting links 2, 3 and 5 of the relay node R2 that is the node α, the connecting links 2 and 5, excluding the link 3, are judged as being the narrowed suspicious locations of the abnormality. The additional search and analysis judging part 41 utilizes the diagnosis result display part 30, and displays, as the narrowed suspicious locations of the abnormality, the connecting links 2 and 5, on the network managing terminal or the like, for example.

The process of analyzing and diagnosing the degree of abnormality of the observation flow passing through the node α is carried out for each connecting link passing pair of the node α. Hence, if the number of connecting links of the node α is denoted by N, the computation and comparison of the degrees of abnormality must be performed for each $_NC_2$ combinations. The process of analyzing and diagnosing the degree of abnormality of the observation flow passing through the node α for each connecting link passing pair of the node α slightly increases the load on the computation, however, the accuracy of the process is improved.

On the other hand, the process of analyzing and diagnosing the degree of abnormality of the observation flow passing through the node α for each connecting link of the node α only requires the computation and comparison of the degrees of abnormality to be performed for N combinations. Thus, the load on the computation is reduced, although the accuracy of the process may deteriorate slightly.

In the process of analyzing and diagnosing the degree of abnormality of the observation flow passing through the node α is carried out for each connecting link passing pair of the node α, and the process of analyzing and diagnosing the degree of abnormality of the observation flow passing through the node α for each connecting link of the node α, the information stored in the network route information DB 34 is utilized in order to judge the connecting link pair or the connecting link of the relay node R2 through which the observation flow passes. However, it is possible to utilize the matrix diagram illustrated in FIG. 2 for these processes when carrying out the first diagnosis accuracy judging process described above.

In the process of analyzing and diagnosing the degree of abnormality of the observation flow passing through the node α is carried out for each connecting link passing pair of the node α, and the process of analyzing and diagnosing the degree of abnormality of the observation flow passing through the node α for each connecting link of the node α, the packet loss rate is used as the flow quality information. However, the flow quality information is not limited to the packet loss rate, and other information, including the RTT, the one-way delay, the jitter, the blackout (or blocking), or the like may be used.

[Example of Process Generating Relay Node Connecting Link Information]

Figure 25:
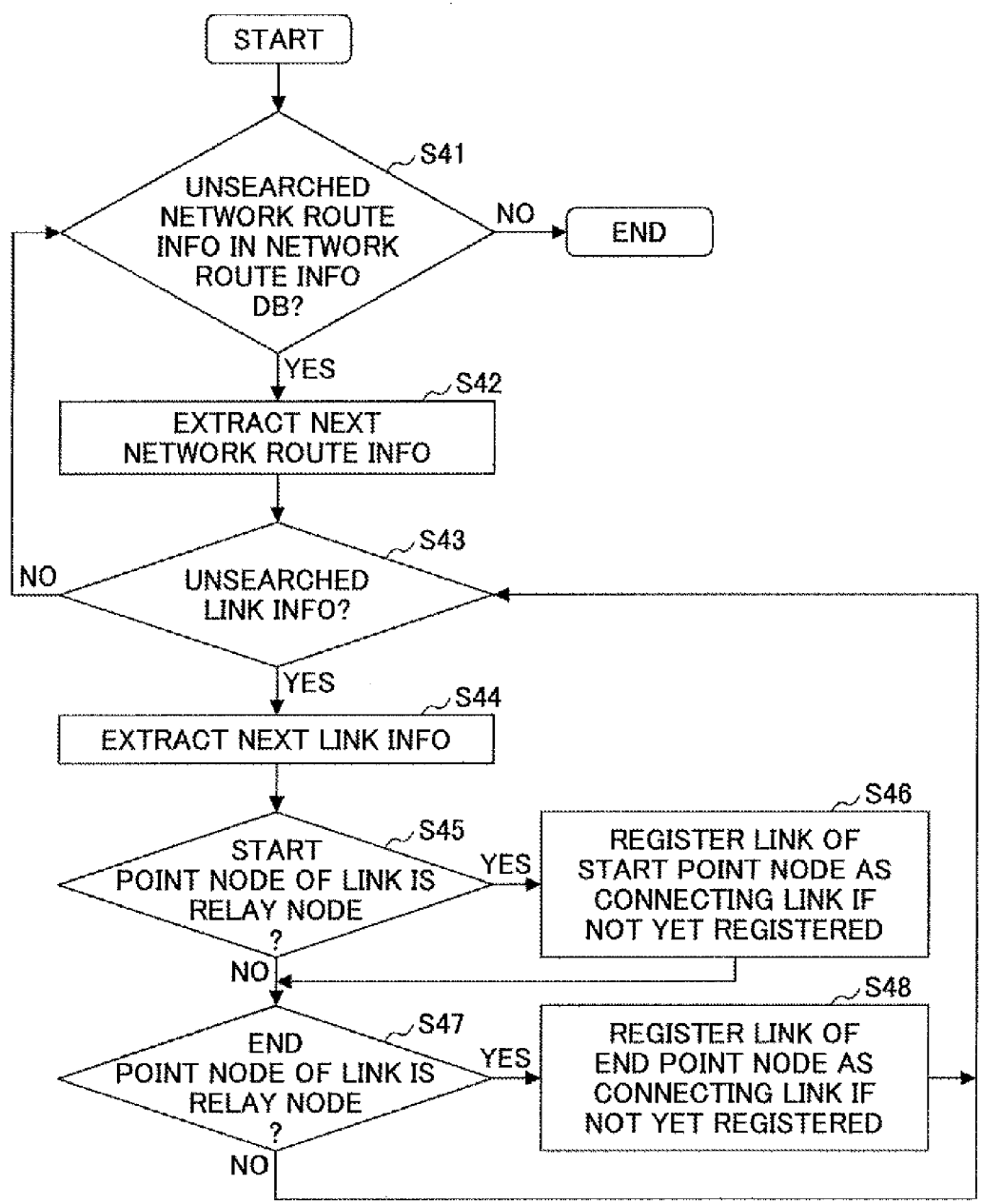
FIG. 25 is a flow chart for explaining a process of generating relay node connecting link information form the information stored in the network route information database.
Figure 26:
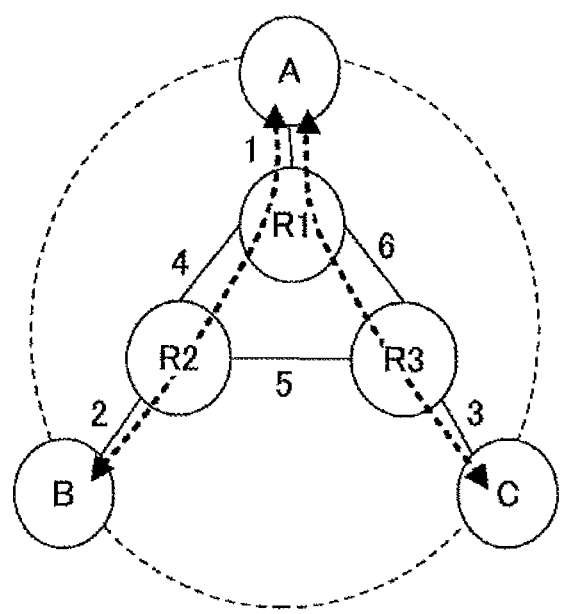
FIG. 26 is a diagram illustrating an example of a monitoring target network.

Next, a description will be given of an example of a process of generating the relay node connecting link information form the information stored in the network route information DB 34. FIG. 25 is a flow chart for explaining a process of generating the relay node connecting link information form the information stored in the network route information DB 34. In a case where the monitoring target network 25 has a structure illustrated in FIG. 26, the information (or contents) stored in the network route information DB 34 becomes as illustrated in FIG. 27. FIG. 26 is a diagram illustrating an example of the monitoring target network 25, and FIG. 27 is a diagram illustrating an example of the information stored in the network route information DB 34. It is assumed in this example that the diagnosis accuracy judging part 42 generates the information stored in the relay node connecting link information DB 35, however, the information stored in the relay node connecting link information DB 35 may be generated by other blocks or apparatuses.

In FIG. 25, the diagnosis accuracy judging part 42 judges whether unsearched passing route information (or network route information) exists in the network route information DB 34, in a step S41. If the judgement result in the step S41 is YES, the diagnosis accuracy judging part 42 extracts the next passing route information, in a step S42.

The diagnosis accuracy judging part 42 judges whether unsearched link information exists in the passing route information that is extracted in the step S42, in a step S43. If the judgement result in the step S43 is YES, the diagnosis accuracy judging part 42 extracts the net link information, in a step S44.

The diagnosis accuracy judging part 42 judges whether a start point node of the link information extracted in the step S44 is a relay node, in a step S45. If the judgement result in the step S45 is YES, the diagnosis accuracy judging part 42 registers the link of the link information extracted in the step S44 into the relay node connecting link information DB 35 if the link of the start point node is not registered in the relay node connecting link information DB 35, in a step S46. The process advances to a step S47 if the judgement result in the step S45 is NO or, after the step S46.

The diagnosis accuracy judging part 42 judges whether an end point node of the link information extracted in the step S44 is a relay node, in the step S47. If the judgement result in the step S47 is NO, the diagnosis accuracy judging part 42 registers the link of the link information extracted in the step S44 into the relay node connecting link information DB 35 if the link of the end point node is not registered in the relay node connecting link information DB 35, in a step S48. The process returns to the step S43 if the judgement result in the step S47 is NO or, after the step S48.

If the judgement result in the step S43 is NO, the process returns to the step S41. The process ends if the judgement result in the step S41 is NO.

According to the process illustrated in FIG. 25, the diagnosis accuracy judging part 42 extracts the passing route information between the observation points A and B (A→R1→R2→B) as the unsearched passing route information of the network route information DB 34. In addition, the diagnosis accuracy judging part 42 extracts the link 1 (A⇔R1) as the first unsearched link information. Further, because the start point node is the observation point A, the diagnosis accuracy judging part 42 skips the link information registration process. On the other hand, because the end point node is the relay node R1, the diagnosis accuracy judging part 42 registers the unregistered link 1 as the connecting link of the relay node R1.

The diagnosis accuracy judging part 42 extracts the link 4 (R1⇔R2) as the next unsearched link information. The diagnosis accuracy judging part 42 registers the unregistered link 4 as the connecting link of the relay node R1 because the start point node is the relay node R1, and registers the unregistered link 4 as the connecting link of the relay node R2 because the end point node is the relay node R2.

The diagnosis accuracy judging part 42 extracts the link 2 (R2⇔B) as the next unsearched link information. The diagnosis accuracy judging part 42 registers the unregistered link 4 as the connecting link of the relay node R2 because the start point node is the relay node R2, and skips the link information registration process because the end point node is the observation point B.

The diagnosis accuracy judging part 42 processes the other passing route information similarly to the passing route information between the observation points A and B. As a result, the links 1, 4 and 6 are registered as the connecting links of the relay node R1, the links 2, 4 and 5 are registered as the connecting links of the relay node R2, and the links 3, 5 and 6 are registered as the connecting links of the relay node R3.

In the process illustrated in FIG. 25, all of the links included in the passing route information are registered, and even the link 5 (R2⇔R3) through which no observation flow passes is also registered. Hence, a judgement may be made in advance to determine whether there exists a link through which no observation flow passes, in order to exclude from the connecting links of the relay node the link through which no observation flow passes, when judging the existence of the node α.

When utilizing the contents of the matrix diagram illustrated in FIG. 2 in order to judge whether no observation flow passes through the link, the judgement may be made by determining whether the observation flow information is set in a link sequence of the matrix in which the observation flows and the observation flow passing links are mapped. On the other hand, when utilizing the final abnormality judgement results illustrated in FIG. 4 in order to judge whether no observation flow passes through the link, the judgement may be made with ease by determining whether the link abnormality judgement result is diagnosable because the link abnormality judgement result is non-diagnosable if the no observation flow passes through the link.

Figure 28:
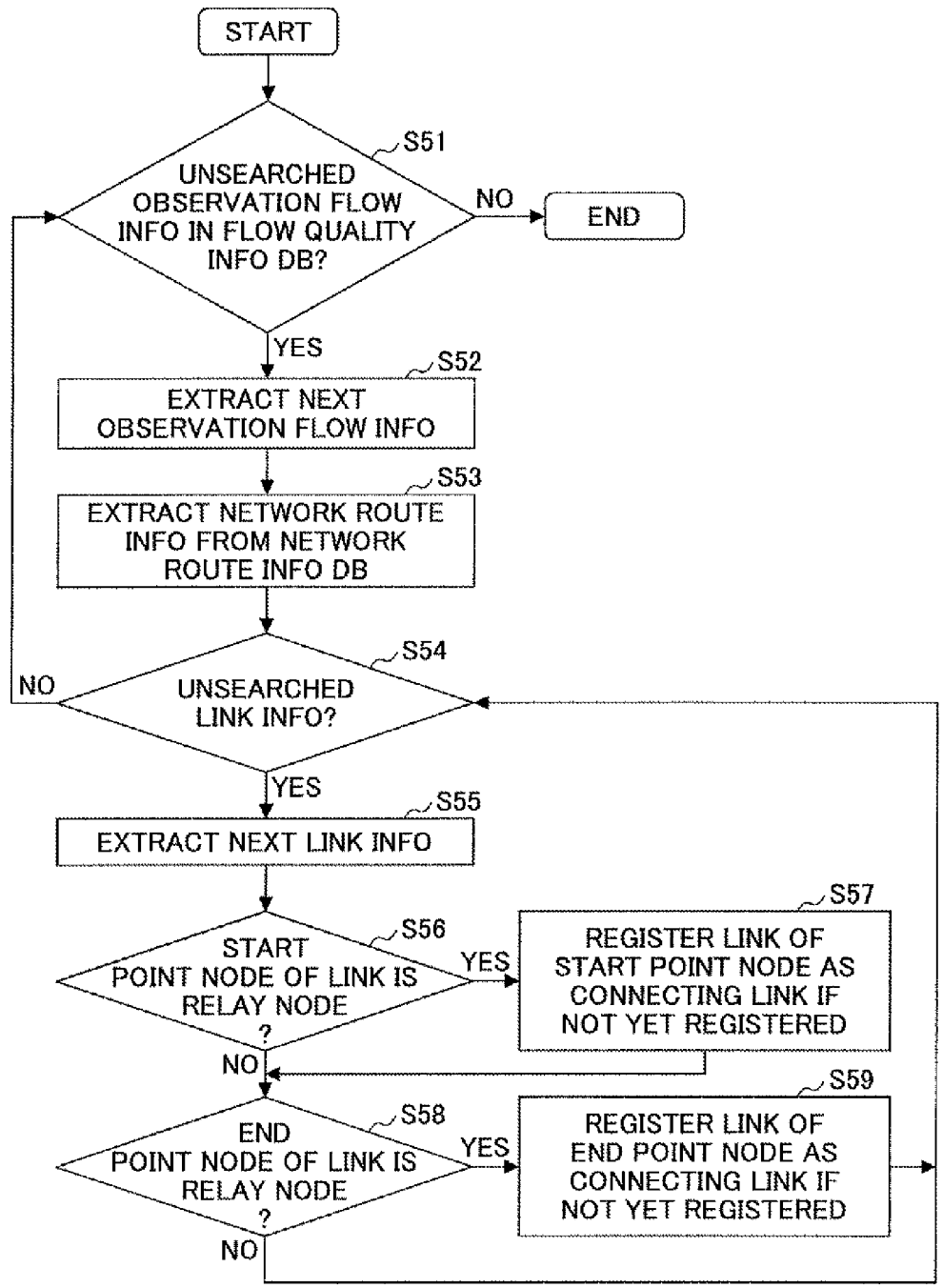
FIG. 28 is a flow chart for explaining a process of generating the relay node connecting link information from information stored in the flow quality information database and the network route information database.

Next, a description will be given of a process of generating the relay node connecting link information from the information stored in the flow quality information DB 33 and the network route information DB 34, which can exclude in advance the links through which no observation flow passes. FIG. 28 is a flow chart for explaining the process of generating the relay node connecting link information from the information stored in the flow quality information DB 33 and the network route information DB 34.

In the case where the monitoring target network 25 has the structure illustrated in FIG. 26, the information (or contents) stored in the network route information DB 34 becomes as illustrated in FIG. 27, and it is assumed for the sake of convenience that the information (or contents) stored in the flow quality information DB 33 becomes as illustrated in FIG. 29.

FIG. 29 is a diagram illustrating an example of the information stored in the flow quality information DB 33.

In FIG. 28, the diagnosis accuracy judging part 42 judges whether unsearched observation flow information exists in the flow quality information DB 33, in a step S51. If the judgement result in the step S51 is YES, the diagnosis accuracy judging part 42 extracts the next observation flow information, in a step S52. In addition, the diagnosis accuracy judging part 42 extracts the passing route information of the observation flow information extracted in the step S52, from the network route information DB 34, in a step S53. Steps S54 through S59 carried out after the step S53 are the same as the steps S43 through S48 illustrated in FIG. 25, and a description thereof will be omitted.

According to the process illustrated in FIG. 28, the diagnosis accuracy judging part 42 extracts the observation flow between the observation points A and B, as the unsearched observation flow information, from the flow quality information DB 33.

In addition, the diagnosis accuracy judging part 42 extracts the passing route information (A→R1→R2→B) between the observation points A and B from the network route information DB 34, as the extracted passing route information of the observation flow between the observation points A and B. The process carried out thereafter by the diagnosis accuracy judging part 42 is the same as in the case illustrated in FIG. 25.

According to the process illustrated in FIG. 28, the link 5 (R2⇔R3) through which no observation flow passes will not be registered. For this reason, when judging the existence of the node α, it is possible to use the relay node connecting link information as it is, and it is unnecessary to carry out a process in advance to exclude the link through which no observation flow passes from the connecting links of the relay node.

According to the abnormality locating apparatus 10 of the described embodiment, the possibility of an erroneous diagnosis is judged by judging the existence of the node α that is the pattern of the location where an abnormality is generated. If the node α exists, it is possible to know that the accuracy of the diagnosis will deteriorate, and thus, it is possible to improve the accuracy of the diagnosis by carrying out the additional measurement and analysis.

Therefore, the diagnosis accuracy judging part 42 of the described embodiment judges the possibility of an erroneous diagnosis of the suspicious location of the abnormality, by utilizing the flow quality information observed at a plurality of observation points. In addition, the diagnosis accuracy judging part 42 of the described embodiment may carry out the additional measurement and analysis in order to more accurately locate the suspicious location of the abnormality. As a result, the diagnosis accuracy judging part 42 of the described embodiment can improve the accuracy of the diagnosis of the suspicious location of the abnormality.

Although the embodiments and examples thereof are numbered with, for example, "first", "second", or "third", the ordinal numbers do not imply priorities of the embodiments or examples thereof. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

Constituent elements, representations and arbitrary combinations of the constituent elements of the embodiments of the present invention may be applied to or, embodied in, methods, apparatuses, systems, computer programs, storage media, data structures and the like.

What is claimed is:

1. An abnormality locating method, to be implemented in a computer, to locate an abnormal location in a network, comprising:
    judging, by the computer, a normality or abnormality of a link based on a normality or abnormality of an observation flow, by acquiring information of links through which each observation flow passes, from a network route information storage that stores passing route information of observation flows passing through the links; and
    judging, by the computer, that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

2. The abnormality locating method as claimed in claim 1, further comprising:
    additionally carrying out, by the computer, a quality measurement with respect to the first node from each observation point when the first node exists, and judging that connecting links connected to the first node, excluding connecting links that are judged as being normal by the additional quality measurement, are abnormal links.

3. The abnormality locating method as claimed in claim 1, further comprising:
    computing, by the computer, a degree of abnormality of an observation flow for each observation flow passing pair of connecting links of the first node when the first node exists, and judging that the connecting links connected to the first node, excluding connecting links of the first node that are common to a plurality of observation flow passing pairs having a degree of abnormality that is small relative to those of other observation flow passing pairs, are abnormal links.

4. The abnormality locating method as claimed in claim 1, wherein said judging the accuracy of judging the normality or abnormality acquires quality information of each observation flow from a flow quality information storage that stores the quality information of each observation flow, judges the normality or abnormality of each observation flow, and relates judgement results of the normality or abnormality of each observation flow to the link through which each observation flow passes.

5. The abnormality locating method as claimed in claim 1, wherein said judging the accuracy of judging the normality or abnormality acquires quality information of each observation flow from a flow quality information storage that stores the quality information of each observation flow, judges the normality or abnormality of each observation flow for each observation point, relates judgement results of the normality or abnormality of each observation flow to the link through which each observation flow passes, judges a possibility of an abnormality of each link for each observation point, using a relationship of high-level links or low-level links in a tree structure when viewed from each observation point, tabulates the possibility of the abnormality of each link judged for each observation point to judge the possibility of abnormality of each link, and relates judgement results of the normality or abnormality of each link to the link through which each observation flow passes.

6. An abnormality locating apparatus for locating an abnormal location in a network, comprising:
    an abnormal location judging part configured to judge a normality or abnormality of a link based on a normality or abnormality of an observation flow, by acquiring information of links through which each observation flow passes, from a network route information storage that stores passing route information of observation flows passing through the links; and
    a diagnosis accuracy judging part configured to judge that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

7. The abnormality locating apparatus as claimed in claim 6, further comprising:
    an additional search and analysis judging part configured to carry out a quality measurement with respect to the first node from each observation point when the first node exists, and to judge that connecting links connected to the first node, excluding connecting links that are judged as being normal by the additional quality measurement, are abnormal links.

8. The abnormality locating apparatus as claimed in claim 6, further comprising:
    an additional search and analysis judging part configured to compute a degree of abnormality of an observation flow for each observation flow passing pair of connecting links of the first node when the first node exists, and to judge that the connecting links connected to the first node, excluding connecting links of the first node that are common to a plurality of observation flow passing pairs having a degree of abnormality that is small relative to those of other observation flow passing pairs, are abnormal links.

9. The abnormality locating apparatus as claimed in claim 6, wherein said abnormal location judging part judges the accuracy of judging the normality or abnormality acquires quality information of each observation flow from a flow quality information storage that stores the quality information of each observation flow, judges the normality or abnormality of each observation flow, and relates judgement results of the normality or abnormality of each observation flow to the link through which each observation flow passes.

10. The abnormality locating apparatus as claimed in claim 6, wherein said abnormal location judging part judges the accuracy of judging the normality or abnormality acquires quality information of each observation flow from a flow quality information storage that stores the quality information of each observation flow, judges the normality or abnormality of each observation flow for each observation point, relates judgement results of the normality or abnormality of each observation flow to the link through which each observation flow passes, judges a possibility of an abnormality of each link for each observation point, using a relationship of high-level links or low-level links in a tree structure when viewed from each observation point, tabulates the possibility of the abnormality of each link judged for each observation point to judge the possibility of abnormality of each link, and relates judgement results of the normality or abnormality of each link to the link through which each observation flow passes.

11. A non-transitory computer-readable storage medium having stored therein a program for causing a computer to execute a process to locate an abnormal location in a network, said process comprising:

judging a normality or abnormality of a link based on a normality or abnormality of an observation flow, by acquiring information of links through which each observation flow passes, from a network route information storage that stores passing route information of observation flows passing through the links; and judging that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

12. The non-transitory computer-readable storage medium as claimed in claim 11, wherein said process further comprises:

additionally carrying out a quality measurement with respect to the first node from each observation point when the first node exists, and judging that connecting links connected to the first node, excluding connecting links that are judged as being normal by the additional quality measurement, are abnormal links.

13. The non-transitory computer-readable storage medium as claimed in claim 11, wherein said process further comprises:

computing a degree of abnormality of an observation flow for each observation flow passing pair of connecting links of the first node when the first node exists, and judging that the connecting links connected to the first node, excluding connecting links of the first node that are common to a plurality of observation flow passing pairs having a degree of abnormality that is small relative to those of other observation flow passing pairs, are abnormal links.

14. The non-transitory computer-readable storage medium as claimed in claim 11, wherein the judging the normality or abnormality acquires quality information of each observation flow from a flow quality information storage that stores the quality information of each observation flow, judges the normality or abnormality of each observation flow, and relates judgement results of the normality or abnormality of each observation flow to the link through which each observation flow passes.

15. The non-transitory computer-readable storage medium as claimed in claim 11, wherein the judging the normality or abnormality acquires quality information of each observation flow from a flow quality information storage that stores the quality information of each observation flow, judges the normality or abnormality of each observation flow for each observation point, relates judgement results of the normality or abnormality of each observation flow to the link through which each observation flow passes, judges a possibility of an abnormality of each link for each observation point, using a relationship of high-level links or low-level links in a tree structure when viewed from each observation point, tabulates the possibility of the abnormality of each link judged for each observation point to judge the possibility of abnormality of each link, and relates judgement results of the normality or abnormality of each link to the link through which each observation flow passes.

16. An abnormality locating system comprising:

a plurality of flow quality measuring agents; and an abnormality locating apparatus, coupled to and communicatable with the plurality of flow quality measuring agents, configured to locate an abnormal location in a network, said abnormality locating apparatus comprising:

an abnormal location judging part configured to judge a normality or abnormality of a link based on a normality or abnormality of an observation flow, by acquiring information of links through which each observation flow passes, from a network route information storage that stores passing route information of observation flows passing through the links; and a diagnosis accuracy judging part configured to judge that an accuracy of judging the normality or abnormality of a connecting link connected to a first node deteriorates, by acquiring links connected to each relay node as connecting links from a relay node connecting link information storage that stores connecting link information of each relay node, and judging that a relay node having all connecting links thereof that are abnormal is the first node having all observation flows passing therethrough that are abnormal.

17. The abnormality locating system as claimed in claim 16, wherein the abnormality locating apparatus further comprises:

an additional search and analysis judging part configured to carry out a quality measurement with respect to the first node from each observation point when the first node exists, and to judge that connecting links connected to the first node, excluding connecting links that are judged as being normal by the additional quality measurement, are abnormal links.

18. The abnormality locating system as claimed in claim 16, wherein the abnormality locating apparatus further comprises:

an additional search and analysis judging part configured to compute a degree of abnormality of an observation flow for each observation flow passing pair of connecting links of the first node when the first node exists, and to judge that the connecting links connected to the first node, excluding connecting links of the first node that are common to a plurality of observation flow passing pairs having a degree of abnormality that is small relative to those of other observation flow passing pairs, are abnormal links.

19. The abnormality locating system as claimed in claim 16, wherein said abnormal location judging part judges the accuracy of judging the normality or abnormality acquires quality information of each observation flow from a flow quality information storage that stores the quality information of each observation flow, judges the normality or abnormality of each observation flow, and relates judgement results of the normality or abnormality of each observation flow to the link through which each observation flow passes.

20. The abnormality locating system as claimed in claim 16, wherein said abnormal location judging part judges the accuracy of judging the normality or abnormality acquires quality information of each observation flow from a flow quality information storage that stores the quality information of each observation flow, judges the normality or abnormality of each observation flow for each observation point, relates judgement results of the normality or abnormality of each observation flow to the link through which each observation flow passes, judges a possibility of an abnormality of each link for each observation point, using a relationship of high-level links or low-level links in a tree structure when viewed from each observation point, tabulates the possibility of the abnormality of each link judged for each observation point to judge the possibility of abnormality of each link, and relates judgement results of the normality or abnormality of each link to the link through which each observation flow passes.

* * * * *